(12) United States Patent
Hiwatashi

(10) Patent No.: US 7,569,292 B2
(45) Date of Patent: *Aug. 4, 2009

(54) SOLID OXIDE FUEL CELL

(75) Inventor: Kenichi Hiwatashi, Fukuoka (JP)

(73) Assignee: Toto Ltd., Fukuoka (JP)

( * ) Notice: Subject to any disclaimer, the term of this patent is extended or adjusted under 35 U.S.C. 154(b) by 293 days.

This patent is subject to a terminal disclaimer.

(21) Appl. No.: 11/071,112

(22) Filed: Mar. 4, 2005

(65) Prior Publication Data

US 2006/0199057 A1 Sep. 7, 2006

(51) Int. Cl.
*H01M 8/00* (2006.01)
(52) U.S. Cl. .............................. 429/12; 429/13; 429/30; 429/31; 429/33
(58) Field of Classification Search .................... 429/30, 429/12, 13, 31, 33
See application file for complete search history.

(56) References Cited

U.S. PATENT DOCUMENTS

| 6,492,051 B1 * | 12/2002 | Gopalan et al. ................ 429/31 |
| 6,558,831 B1 * | 5/2003 | Doshi et al. ..................... 429/30 |
| 2002/0028367 A1 * | 3/2002 | Sammes et al. ................ 429/31 |
| 2006/0093884 A1 * | 5/2006 | Seabaugh et al. ............. 429/33 |
| 2006/0166070 A1 * | 7/2006 | Hickey et al. .................. 429/33 |

FOREIGN PATENT DOCUMENTS

| JP | 7-6774 A | 1/1995 |
| JP | 10-158894 A | 6/1998 |
| JP | 2813355 B2 | 8/1998 |
| JP | 11-273451 A | 10/1999 |
| JP | 11-335164 A | 12/1999 |
| JP | 2002-15756 A | 1/2002 |

* cited by examiner

*Primary Examiner*—Jane Rhee
(74) *Attorney, Agent, or Firm*—Carrier, Blackman & Associates, P.C.; Joseph P. Carrier; William D. Blackman

(57) ABSTRACT

The present invention provides an electrolyte membrane of a solid oxide fuel cell that excels in output performance. There is provided a solid oxide fuel cell comprising a single cell having an air electrode disposed on a surface of an electrolyte membrane and a fuel electrode disposed on the other surface of the electrolyte membrane, and an interconnector having a role of electrical connection; wherein the electrolyte membrane is provided with a first layer composed of a material having an oxygen-ionic conductivity of S1 on the air-electrode side, and a second layer composed of a material containing at least zirconia and having an oxygen-ionic conductivity of S2 on the fuel-electrode side; and wherein the oxygen-ionic conductivity of S1 on the air-electrode side and the oxygen-ionic conductivity of S2 on the fuel electrode side have a relationship of S1>S2.

22 Claims, 2 Drawing Sheets

SOLID OXIDE FUEL CELL

BACKGROUND OF THE INVENTION

1. Field of the Invention

The present invention relates to a solid oxide fuel cell that excels in output performance. Specifically, the present invention relates to a solid oxide fuel cell having an electrolyte membrane free of gas permeability that excels in oxygen-ionic conductivity, and having a high output performance even at a power-generating temperature of 900.degree. C. or below.

2. Description of the Related Art

As an electrolyte membrane for a conventional solid oxide fuel cell, a layer composed of yttria-doped zirconia (hereafter referred to as YSZ) has been proposed. (For example, see Patent Document 1.) Since YSZ excels in sintering properties, it is possible to easily fabricate an electrolyte membrane free of gas permeability; however, there has been a problem that the output performance of a solid oxide fuel cell using this material for the electrolyte membrane is deteriorated because the oxygen-ionic conductivity of the electrolyte membrane is decreased at low temperatures of 900.degree. C. or below, and the reaction of Equation (1) occurring between the air electrode and the electrolyte membrane cannot be efficiently promoted.

$$\tfrac{1}{2}O_2 + 2e^- \rightarrow O^{2-} \quad (1)$$

The electrolyte membrane free of gas permeability used herein is evaluated by the gas permeability of the gas permeated between one side and the opposite side of the electrolyte membrane when pressure difference is created between them, and has a gas permeability $Q \leq 2.8 \times 10^{-9}\ ms^{-1}\ Pa^{-1}$ (more preferably $Q \leq 2.8 \times 10^{-10}\ ms^{-1}\ Pa^{-1}$).

As an electrolyte membrane for a solid oxide fuel cell, a layer composed of scandia-doped zirconia (hereafter referred to as SSZ) has been proposed. (For example, see Patent Document 2.) Since SSZ has a higher oxygen-ionic conductivity than YSZ, it is expected that the output performance of a solid oxide fuel cell is elevated if this material is adopted as the electrolyte membrane. However, although the present inventors fabricated an electrolyte membrane using the material described in Patent Document 2, as a result of the test conducted by the present inventors, it was difficult to fabricate an electrolyte membrane free of gas permeability.

As an electrolyte membrane for a solid oxide fuel cell, a layer composed of ceria doped with samaria, gadolinia or the like has been proposed. (For example, see Patent Documents 3 and 4.) Since the material proposed in Patent Documents 3 and 4 has electronic conductivity in a fuel-gas environment of the solid oxide fuel cell, there has been a problem that the output performance is deteriorated if the electrolyte membrane is composed of the proposed materials only.

As an electrolyte membrane for a solid oxide fuel cell, a layer composed of lanthanum gallate has been proposed. (For example, see Patent Documents 5 and 6.) When a manganese-containing oxide, such as lanthanum manganite, is adopted as the air electrode of the solid oxide fuel cell, electronic conductivity is produced in the material proposed in Patent Documents 5 and 6 due to diffusion of manganese components, and there has been a problem that the output performance is deteriorated if the electrolyte membrane is composed of the proposed materials only.

[Patent Document 1] Japanese Patent Application Publication No. 10-158894 (p. 1-6, FIGS. 1-12)

[Patent Document 2] Japanese Patent Application Publication No. 7-6774 (p. 1-5, FIGS. 1-5)

[Patent Document 3] Japanese Patent Application Publication No. 11-273451 (p. 1-8, FIGS. 1-5)

[Patent Document 4] Japanese Patent No. 2813355 (p. 1-5, FIGS. 1-5)

[Patent Document 5] Japanese Patent Application Publication No. 2002-15756 (p. 1-9, FIGS. 1-9)

[Patent Document 6] Japanese Patent Application Publication No. 11-335164 (p. 1-12, FIGS. 1-12)

SUMMARY OF THE INVENTION

The object of the present invention is to solve the above problems, and to provide a solid oxide fuel cell having excellent output performance by optimizing the material on the air-electrode side of an electrolyte membrane and the material on the fuel-electrode side of the electrolyte membrane.

In order to achieve the above object, the present invention provides a solid oxide fuel cell comprising a single cell having an air electrode disposed on a surface of an electrolyte membrane and a fuel electrode disposed on the other surface of the electrolyte membrane, and an having a role of electrical connection; wherein the electrolyte membrane is provided with a first layer composed of a material having an oxygen-ionic conductivity of S1 on the air-electrode side, and a second layer composed of a material containing at least zirconia and having an oxygen-ionic conductivity of S2 on the fuel-electrode side; and wherein the oxygen-ionic conductivity of S1 on the air-electrode side and the oxygen-ionic conductivity of S2 on the fuel-electrode side have a relationship of S1<S2.

According to the present invention, a solid oxide fuel cell having excellent output performance can be provided by forming a first layer composed of an electrolytic material having high oxygen-ionic conductivity on the air-electrode side, and a second layer composed of a material containing at least zirconia on the fuel-electrode side.

The reason is that since the oxygen-ionic conductivity of the first layer in the electrolyte membrane is high, the reaction of Equation (1) taking place between the air electrode and the electrolyte membrane can be efficiently promoted, and since the second layer in the electrolyte membrane contains zirconia, an electrolyte membrane free of gas permeability can be easily fabricated.

In a preferred embodiment of the present invention, the thickness of the first layer in the electrolyte membrane is 5 to 90% of the total thickness of the electrolyte membrane.

An electrolyte membrane having high oxygen-ionic conductivity and no gas permeability can be easily fabricated by making the thickness of the first layer in the electrolyte membrane within the above range.

The reason is that if the thickness of the first layer is 5% or less of the total thickness of the electrolyte. membrane, the oxygen-ionic conductivity of the whole electrolyte membrane is lowered, the reaction of Equation (1) cannot be efficiently promoted, and the output performance is deteriorated. On the other hand, if the thickness of the first layer exceeds 90% of the total thickness of the electrolyte membrane, there is a problem that the cost of the material for the electrolyte membrane is impractically high, or an electrolyte membrane free of gas permeability cannot be easily fabricated.

In a preferred embodiment of the present invention, the thickness of the first layer is 30 to 80% of the total thickness of the electrolyte membrane.

An electrolyte membrane having high oxygen-ionic conductivity free of gas permeability can be easily fabricated, and a solid oxide fuel cell having excellent output performance can be provided by making the thickness of the first layer in the electrolyte membrane within the above further-limited range.

The reason is that if the thickness of the first layer is less than 30% of the total thickness of the electrolyte membrane, the oxygen ion conductivity of the entire electrolyte membrane is slightly low, and there is a possibility that the output performance is deteriorated in the power generation at a temperature of 900.degree. C. or below. On the other hand, if the thickness of the first layer exceeds 80% of the total thickness of the electrolyte membrane, there is a possibility that the cost of the material for the electrolyte membrane is somewhat high, or an electrolyte membrane free of gas permeability cannot be fabricated at a low temperature.

In a preferred embodiment of the present invention, the material of the second layer in the electrolyte membrane is YSZ.

By making an electrolyte membrane contain a YSZ material, the electrolyte membrane free of gas permeability can be easily fabricated.

The reason is that the YSZ material is easily sintered, and is preferable for forming an electrolyte membrane free of gas permeability.

In a preferred embodiment of the present invention, the material of the first layer in the electrolyte membrane is SSZ.

By using an SSZ in the air-electrode side of the electrolyte membrane, since an electrolyte membrane having excellent oxygen-ionic conductivity free of gas permeability can be fabricated, a solid oxide fuel cell having excellent output performance can be provided.

The reason is that since an SSZ material having high oxygen-ionic conductivity is provided on the air-electrode side, the reaction of Equation (1) taking place between the air electrode and the electrolyte membrane can be efficiently performed, and since YSZ is laminated, an electrolyte membrane free of gas permeability can be easily fabricated.

In a preferred embodiment of the present invention, the doped amount of scandia in SSZ is 3 to 12 mol %.

By making the amount of scandia 3 to 12 mol %, the reaction of Equation (1) can be efficiently promoted, and a solid oxide fuel cell having excellent output performance can be provided.

The reason is that if the amount of scandia is less than 3 mol %, the oxygen-ionic conductivity of the material is lowered, and the output performance is deteriorated. On the other hand, if the amount is larger than 12 mol %, rhombohederal crystals are formed in addition to cubic crystals in the crystal phase, and the oxygen-ionic conductivity is lowered.

In a preferred embodiment of the present invention, the amount of scandia in the SSZ material is 8 to 12 mol %.

Since the amount of scandia is made 8 to 12 mol %, the reaction of Equation (1) can be more efficiently promoted, and a solid oxide fuel cell having excellent output performance can be provided.

The reason is that within the range of 8 to 12 mol %, the oxygen-ionic conductivity is highest, and the resistance loss in the electrolyte membrane is smallest.

In a preferred embodiment of the present invention, the SSZ material is further doped with at least one oxide of 5 mol % or less which is selected from a group consisting of $CeO_2$, $Sm_2O_3$, $Gd_2O_3$, $Yb_2O_3$, $Er_2O_3$ and $Bi_2O_3$.

According to the present invention, by doping with at least one oxide of 5 mol % or less which is selected from a group consisting of $CeO_2$, $Sm_2O_3$, $Gd_2O_3$, $Yb_2O_3$, $Er_2O_3$ and $Bi_2O_3$, a solid oxide fuel cell having excellent output performance can be provided.

The reason why it is preferable to contain such an oxide of 5 mol % or less is at least one of the high oxygen-ionic conductivity and the improved sintering properties of the material. More specifically, if the oxygen-ionic conductivity is high, the output performance is improved, and if the sintering properties are improved, an electrolyte membrane free of gas permeability can be formed at a low temperature. It is also preferable to dope with two or more oxides because there is a possibility that both effects of oxygen-ionic conductivity and gas permeability can be obtained. On the other hand, if an oxide of more than 5 mol % is contained, there is a possibility that rhombohederal crystals are formed in addition to cubic crystals in the crystal phase, and the oxygen-ionic conductivity is lowered.

In a preferred embodiment of the present invention, the amount of yttria in YSZ material is 3 to 12 mol %.

By making the amount of yttria within the above-described range, an electrolyte membrane free of gas permeability can be easily fabricated, and a solid oxide fuel cell having excellent output performance can be provided.

The reason for limiting the range of the amount of yttria to 3 to 12 mol % is that if the amount of yttria is less than 3 mol %, the oxygen-ionic conductivity of the material is low, and the stability of the crystal phase is deteriorated. On the other hand, if the amount is larger than 12 mol %, rhombohederal crystals are formed in addition to cubic crystals in the crystal phase, and the oxygen-ionic conductivity is lowered.

In a preferred embodiment of the present invention, both the first and second layers in the electrolyte membrane are composed of zirconia doped with at least scandia and yttria, and the amount $Sc1$ of scandia in the first layer, and the amount $Sc2$ of scandia in the second layer have a relationship of $Sc1 < Sc2$.

According to the present invention, a solid oxide fuel cell having excellent output performance can be provided by forming a zirconia layer containing a large quantity of scandia on the air-electrode side, and forming a zirconia layer containing a small quantity of scandia on the fuel-electrode side.

The reason is that since the zirconia layer on the air-electrode side contains a large quantity of scandia, the oxygen-ionic conductivity is high, and the reaction of Equation (1) can be efficiently promoted, and since the zirconia layer on the fuel-electrode side contains a small quantity of scandia, an electrolyte membrane having excellent sintering properties and free of gas permeability can be easily fabricated.

In a preferred embodiment of the present invention, in the two electrolyte membrane layers composed of zirconia doped with at least scandia and yttria, the total amount of scandia and yttria in either layer composed of zirconia doped with scandia and yttria is 3 to 12 mol %.

According to the present invention, by making the total amount of scandia and yttria 3 to 12 mol %, a solid oxide fuel cell having excellent output performance can be provided.

The reason is that if the total amount of scandia and yttria is within the range of less than 3 mol %, the oxygen-ionic conductivity of the material is lowered, and the output performance is deteriorated. On the other hand, if the total amount is larger than 12 mol %, rhombohederal crystals are formed in addition to cubic crystals in the crystal phase, and the oxygen-ionic conductivity is lowered.

Zirconia doped with at least scandia and yttria may be zirconia doped with two kinds of oxides, i.e., scandia and yttria, and may be doped with other components. For example, zirconia doped with scandia, yttria and ceria or the like is possible.

In a preferred embodiment of the present invention, the layer composed of zirconia doped with scandia and yttria is further doped with at least one oxide of 5 mol % or less which is selected from a group consisting of $CeO_2$, $Sm_2O_3$, $Gd_2O_3$, $Yb_2O_3$, $Er_2O_3$ and $Bi_2O_3$.

According to the present invention, by doping with at least one oxide of 5 mol % or less which is selected from a group consisting of $CeO_2$, $Sm_2O_3$, $Gd_2O_3$, $Yb_2O_3$, $Er_2O_3$ and $Bi_2O_3$ in the layer composed of zirconia doped with scandia and yttria, a solid oxide fuel cell having excellent output performance can be provided.

The reason why it is preferable to contain such an oxide of 5 mol % or less is at least one of the high oxygen-ionic conductivity and the improved sintering properties of the material. More specifically, if the oxygen-ionic conductivity is high, the output performance is improved, and if the sintering properties are improved, an electrolyte membrane free of gas permeability can be formed at a low temperature. It is also preferable to dope with two or more oxides because there is a possibility that both effects of oxygen-ionic conductivity and gas permeability can be obtained. On the other hand, if an oxide of more than 5 mol % is contained, rhombohederal crystals are formed in addition to cubic crystals in the crystal phase, and the oxygen-ionic conductivity is lowered.

In a preferred embodiment of the present invention, the first layer in the electrolyte membrane is composed of lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr).

By forming layers composed of the above-described lanthanum gallate material in the air-electrode side, a solid oxide fuel cell having excellent output performance can be provided.

The reason is that the above-described lanthanum gallate material has high oxygen-ionic conductivity, and the reaction of Equation (1) taking place between the air electrode and the electrolyte membrane can be efficiently promoted.

In a preferred embodiment of the present invention, the first layer in the electrolyte membrane is composed of a cerium-containing oxide represented by $(CeO_2)_{1-2x}(B_2O_3)_x$ (where B is any one of Sm, Gd and Y, $0.05 \leq X \leq 0.15$).

According to the present invention, by forming layers composed of a cerium-containing oxide represented by $(CeO_2)_{1-2x}(B_2O_3)_x$ (where B is any one of Sm, Gd and Y, $0.05 \leq X \leq 0.15$) in the air-electrode side of the electrolyte membrane, a solid oxide fuel cell having excellent output performance can be provided.

The reason is that by providing a cerium-containing oxide represented by $(CeO_2)_{1-2x}(B_2O_3)_x$ (where B is any one of Sm, Gd and Y, $0.05 \leq X \leq 0.15$) having high oxygen-ionic conductivity on the air-electrode side, oxygen ion formed by the reaction of Equation (1) taking place between the air electrode and the electrolyte membrane can be efficiently supplied to the electrolyte membrane.

Furthermore, by providing an electrolyte membrane composed of a zirconia-containing material on the fuel-electrode side, since the cerium-containing oxide is not exposed to the fuel-gas atmosphere and has no electronic conductivity, a solid oxide fuel cell having excellent output performance can be provided.

Another embodiment of the present invention is a solid oxide fuel cell comprising a single cell having an air electrode disposed on a surface of an electrolyte membrane and a fuel electrode disposed on the other surface the electrolyte membrane, and an interconnector having a role of electrical connection; wherein the electrolyte membrane is provided with a first layer composed of a zirconia material doped with at least scandia and having an oxygen-ionic conductivity of S1 on the air-electrode side, and a second layer containing at least a cerium-containing oxide and having an oxygen-ionic conductivity of S2 on the fuel-electrode side, and the oxygen-ionic conductivity of S1 on the air-electrode side and the oxygen-ionic conductivity of S2 on the fuel-electrode side have a relationship of S1>S2.

According to the present invention, by providing the first layer composed of a zirconia material doped with at least scandia on the air-electrode side, and a second layer containing at least a cerium-containing oxide on the fuel-electrode side, a solid oxide fuel cell having excellent output performance can be provided.

The reason is that since the zirconia material doped with at least scandia is laminated on the air-electrode side, the effect of the electronic conductivity of the cerium-containing oxide provided on the fuel-electrode side can be suppressed, and since the scandia-doped zirconia layer having high oxygen-ionic conductivity is provided on the air-electrode side, the reaction of Equation (1) taking place between the air electrode and the electrolyte membrane can be efficiently promoted.

In a preferred embodiment of the present invention, the thickness of the first layer is 10 to 90% of the total thickness of the electrolyte membrane.

According to the present invention, a solid oxide fuel cell having excellent output performance can be provided by making the thickness of the first layer within the above range.

The reason is that if the thickness of the first layer is less than 10%, the electronic conductivity in the second layer containing a cerium-containing oxide becomes larger than the oxygen-ionic conductivity, and the output performance is deteriorated. On the other hand, if the thickness of the first layer is more than 90%, there is a problem that the cost of the material for the electrolyte membrane is impractically high, or an electrolyte membrane free of gas permeability cannot be easily fabricated.

In a preferred embodiment of the present invention, the thickness of the first layer is 30 to 80% of the total thickness of the electrolyte membrane.

By making the thickness of the first layer within the above further-limited range, a solid oxide fuel cell having more excellent output performance can be provided.

The reason is that if the thickness of the first layer is less than 30%, the output performance is somewhat deteriorated by the effect of the electronic conductivity of the cerium-containing oxide provided on the fuel-electrode side. On the other hand, if the thickness of the first layer is more than 80%, there is a possibility that the cost of the material for the electrolyte membrane is somewhat high, or fabrication of an electrolyte membrane free of gas permeability at a low temperature is difficult.

In a preferred embodiment of the present invention, the second layer in the electrolyte membrane is composed of a cerium-containing oxide represented by a general formula $(CeO_2)_{1-2x}(B_2O_3)_x$ (where B is any one of Sm, Gd and Y, $0.05 \leq X \leq 0.15$).

According to the present invention, by providing the layer composed of a cerium-containing oxide represented by a general formula $(CeO_2)_{1-2x}(B_2O_3)_x$ (where B is any one of Sm, Gd and Y, $0.05 \leq X \leq 0.15$) on the fuel-electrode side of the electrolyte membrane, a solid oxide fuel cell having excellent output performance can be provided.

The reason is that by providing the layer composed of a cerium-containing oxide represented by a general formula $(CeO_2)_{1-2x}(B_2O_3)_x$ (where B is any one of Sm, Gd and Y, $0.05 \leq X \leq 0.15$) which has high oxygen-ionic conductivity on the fuel-electrode side, the reactions of Equations (2) and (3)

taking place between the electrolyte membrane and the fuel electrode can be efficiently promoted, and by employing a zirconia material doped with at least scandia having high oxygen-ionic conductivity on the air-electrode side, the reaction of Equation (1) taking place between the air electrode and the electrolyte membrane can be efficiently promoted.

$$H_2 + O^{2-} \rightarrow H_2O + 2e^- \tag{2}$$

$$CO + O^{2-} \rightarrow CO_2 + 2e^- \tag{3}$$

In a preferred embodiment of the present invention, an electrode reaction layer having open pores is interposed between the electrolyte membrane and the air electrode so as to accelerate the reaction of forming oxygen ion from oxygen gas and electron.

By forming the layer having open pores between the electrolyte membrane and the air electrode so as to accelerate the reaction of forming oxygen ion, a solid oxide fuel cell having excellent output performance can be provided.

The reason is that since oxygen ion is formed in a structure where oxygen gas can easily enter, the reaction of Equation (1) is accelerated, and oxygen ion can be efficiently supplied to the electrolyte membrane.

In a preferred embodiment of the present invention, the electrode reaction layer is composed of a layer in which lanthanum manganite represented by a general formula $(La_{1-x}A_x)_yMnO_3$ (where A is either Ca or Sr) and scandia-doped zirconia are evenly mixed (hereafter referred to as LaAMnO$_3$/SSZ).

According to the present invention, by forming the electrode reaction layer composed of LaAMnO$_3$/SSZ between the air electrode and the electrolyte membrane, a solid oxide fuel cell having excellent output performance can be provided even at a power generating temperature of about 700.degree. C.

The reason is that since LaAMnO$_3$/SSZ has high electronic conductivity and oxygen-ionic conductivity even at a low temperature of about 700.degree. C., the reaction of Equation (1) taking place between the air electrode and the electrolyte membrane can be efficiently promoted, and since the oxygen-ionic conductivity of the material of the electrolyte membrane on the air-electrode side is high, oxygen ion can be efficiently supplied to the fuel electrode, and high output performance can be obtained even at a low temperature of about 700.degree. C.

The layer in which lanthanum manganite represented by a general formula $(La_{1-x}A_x)_yMnO_3$ (where A is either Ca or Sr) and SSZ are evenly mixed can be obtained using a material prepared by a liquid-phase method such as a co-precipitation method. The word "evenly" refers to evenness of the level of a material obtained using a co-precipitation method.

In a preferred embodiment of the present invention, the air electrode is composed of lanthanum manganite represented by a general formula $(La_{1-x}A_x)_yMnO_3$ (where A is either Ca or Sr) (hereafter referred to as LaAMnO$_3$).

According to the present invention, by employing the composition of the air electrode as mentioned above, a solid oxide fuel cell having excellent output performance can be provided.

The reason is that the composition has high electronic conductivity in the air atmosphere of a solid oxide fuel cell, and is stable as a material.

In a preferred embodiment of the present invention, the electrolyte membrane is formed on a surface of the electrode reaction layer, and then sintered at 1350 to 1500.degree. C.

According to the present invention, since the electrolyte membrane is formed on a surface of the electrode reaction layer, and then sintered at an adequate temperature, the reaction of Equation (1) taking place between the air electrode and the electrolyte membrane can be efficiently promoted, and an electrolyte membrane free of gas permeability can be formed.

The reason is that the sintering temperature below 1350.degree. C. is too low to form the electrolyte membrane free of gas permeability, and the sintering temperature above 1500degree. C. raises the reactivity with the air electrode or the electrode reaction layer, lowers the oxygen-ionic conductivity of the electrolyte membrane, and deteriorates the output performance.

EFFECT OF THE INVENTION

Since the present invention provides a solid oxide fuel cell comprising a single cell having an air electrode disposed on a surface of an electrolyte membrane and a fuel electrode disposed on the other surface of the electrolyte membrane, and an interconnector having a role of electrical connection; wherein the electrolyte membrane is provided with a first layer composed of a material having an oxygen-ionic conductivity of S1 on the air-electrode side, a second layer composed of a material containing at least zirconia having an oxygen-ionic conductivity of S2 on the fuel-electrode side, and the oxygen-ionic conductivity of S1 on the air-electrode side and the oxygen-ionic conductivity of S2 on the fuel-electrode side have a relationship of S1>S2, a solid oxide fuel cell having excellent output performance can be provided.

DETAILED DESCRIPTION OF THE PREFERRED EMBODIMENTS

A solid oxide fuel cell according to the present invention will be described referring to FIG. 1.

Figure 1:
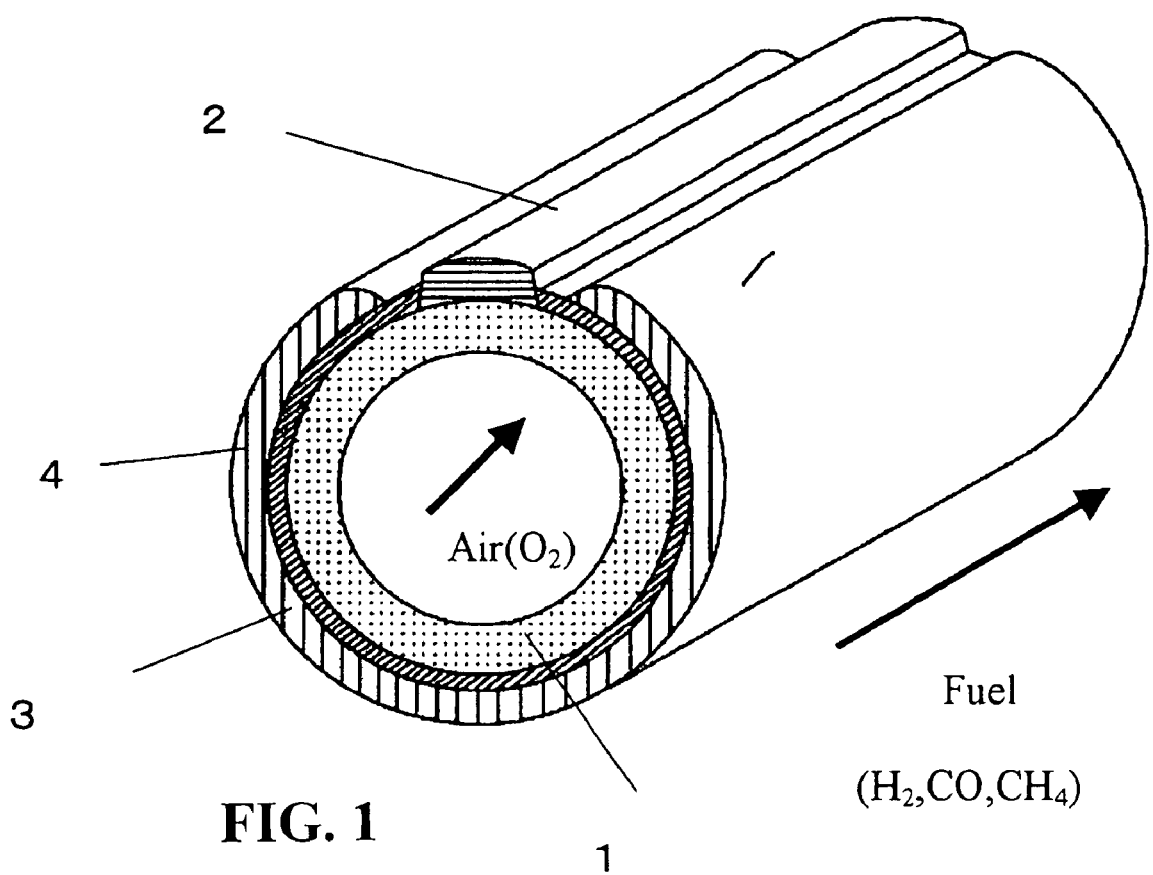
FIG. 1 is a view showing a section of a cylindrical solid oxide fuel cell.

FIG. 1 is a view showing a section of a solid oxide fuel cell of a cylindrical type. A strip-shaped interconnector 2 and an electrolyte membrane 3 are formed on a cylindrical air-electrode support 1, and a fuel electrode 4 is formed on the electrolyte membrane 3 so as not to contact the interconnector 2. When air is flowed through the inside of the air-electrode support 1, and a fuel gas is flowed through the outside, oxygen in the air is converted into oxygen ion at the boundary between the air electrode and the electrolyte membrane, and the oxygen ion pass through the electrolyte membrane and reach the fuel electrode. The fuel gas reacts with the oxygen ion to form water and carbon dioxide. These reactions are shown in Equations (2) and (3). By connecting the fuel electrode 4 with the interconnector 2, electricity can be taken out.

$$H_2 + O^{2-} \rightarrow H_2O + 2e^- \tag{2}$$

$$CO + O^{2-} \rightarrow CO_2 + 2e^- \tag{3}$$

Figure 2:
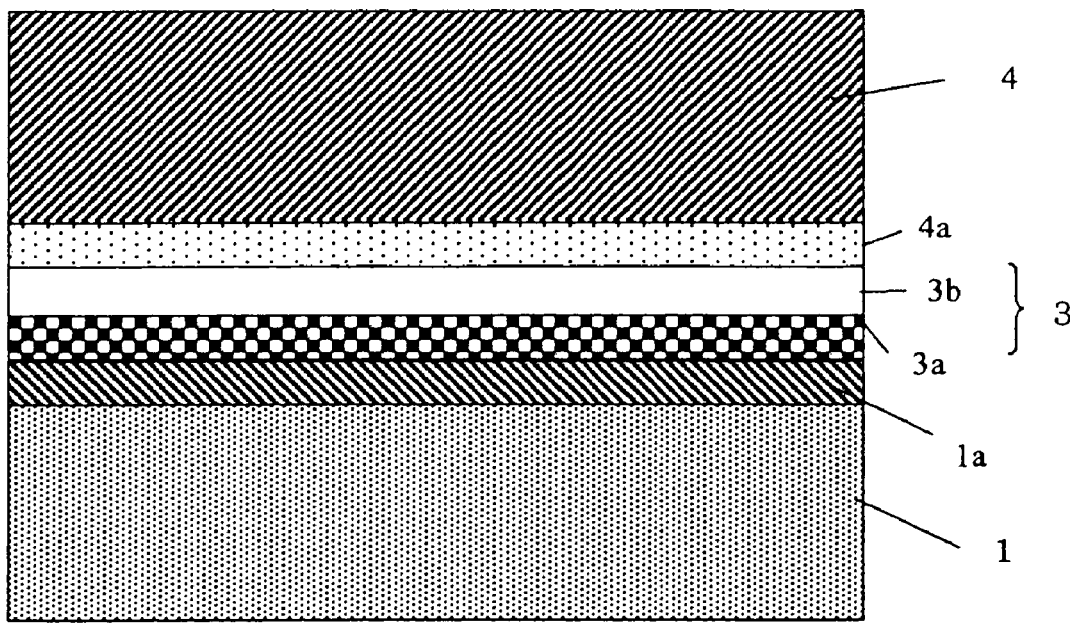
FIG. 2 is a sectional view showing the structure of the air electrode, the Electrolyte membrane, and the fuel electrode of the solid oxide fuel cell of FIG. 1.

FIG. 2 is a sectional view showing the solid oxide fuel cell in which an electrode reaction layer 1a is formed between the air electrode 1 and the electrolyte membrane 3, a fuel-electrode-side reaction layer 4a is formed between the electrolyte membrane 3 and the fuel electrode 4, and the electrolyte membrane 3 is consisted of two layers, i.e., a first layer 3a and a second layer 3b. The electrode reaction layer 1a is formed to accelerate the reaction of Equation (1) in which oxygen ion is formed from oxygen gas of the air electrode and electron, and the oxygen ion formed in the electrode reaction layer 1a pass through the electrolyte membrane 3a and 3b to the fuel-electrode side. Then, the reactions of Equations (2) and (3) take place in the fuel-electrode-side-reaction layer 4a, and by connecting the fuel electrode 4 to the interconnector 2, electricity can be taken out. Therefore, if the electrode reaction layer, the electrolyte membrane and the fuel-electrode-side reaction layer are optimized, a solid oxide fuel cell having excellent output performance even at a temperature as low as about 700° C. can be provided.

$$\tfrac{1}{2}O_2 + 2e^- \rightarrow O^{2-} \quad (1)$$

It is preferable that the electrolyte membrane according to the present invention has high oxygen-ionic conductivity in the air atmosphere and the fuel-gas atmosphere at the power generating temperature of the solid oxide fuel cell, has no gas permeability, and has no electronic conductivity. Particularly, in order to efficiently promote the reaction of Equation (1), it is preferable that at least the material of the electrolyte membrane on the air-electrode side is composed of a material having high oxygen-ionic conductivity.

Since materials having high oxygen-ionic conductivity that have been developed to date such as SSZ and lanthanum gallate have problems that the cost is high and the sintering properties are low. Therefore, in terms of the practicality of a solid oxide fuel cell, it is preferable to laminate materials having a low cost, high sintering properties, and a certain degree of oxygen-ionic conductivity. Specifically, in the electrolyte membrane according to the present invention, a first layer composed of a material having high oxygen-ionic conductivity on the air-electrode side, and a second layer composed of a material containing at least zirconia having excellent sintering properties are laminated.

As the first layer in the electrolyte membrane of the present invention, a material having high oxygen-ionic conductivity is preferred. From this point of view, the examples of the material for the first layer include SSZ, a cerium-containing oxide, a mixed layer of SSZ and a cerium-containing oxide, and lanthanum gallate represented by $(La_{1-x}Sr_xGa_{1-y}MG_yO_3)$ and $(La_{1-x}Sr_xGa_{1-y-z}Mg_yCO_zO_3)$. A zirconia-based material doped with at least scandia and yttria (hereafter referred to as ScYSZ), a zirconia material containing SSZ and YSZ (hereafter referred to as SSZ/YSZ), a material containing SSZ and lanthanum gallate, and SSZ doped with $CeO_2$, $Bi_2O_3$ or the like may be used.

The cerium-containing oxide is not limited as far as the oxide contains cerium; however, from the point of view of high oxygen-ionic conductivity, the cerium-containing oxide represented by a general formula $(CeO_2)_{1-2x}(B_2O_3)_x$ (where B is any one of Sm, Gd and Y, and $0.05 \leq X \leq 0.15$) is preferred.

The material having high oxygen-ionic conductivity is preferably a material having oxygen-ionic conductivity of 0.1 Scm$^{-1}$ or more at 1000° C., and more preferably 0.02 Scm$^{-1}$ or more even at 700° C. The reason is that if a material having oxygen-ionic conductivity of 0.1 Scm$^{-1}$ or more at 1000° C. is adopted for the electrolyte membrane, it is possible to provide a solid oxide fuel cell having high output performance at 900 to 1000° C., and if a material has oxygen-ionic conductivity of 0.02 Scm$^{-1}$ or more at 700° C., it may be possible to provide a solid oxide fuel cell having high output performance at a low temperature of 700° C.

A method for measuring oxygen-ionic conductivity will be described. A binder such as PVA is mixed into a material for the electrolyte membrane, press-formed using a disc-shaped mold, and thereafter sintered to prepare a sample free of gas permeability. After a platinum electrode is fixed onto the sample, the temperature is raised to 1000° C., and the oxygen-ionic conductivity of the sample is measured using an AC impedance measuring method. Also, the oxygen-ionic conductivity of the sample in a case of 700° C. is measured in the same manner.

The data of 1000° C. and 700° C. measured in this way are shown. The relationship between the oxygen-ionic conductivity S1 and S2 of the present invention is a relationship when the values of oxygen-ionic conductivity at 1000° C. are compared, and the material of the oxygen-ionic conductivity S1 on the air-electrode side and the material of the oxygen-ionic conductivity S2 on the fuel-electrode side has a relationship of S1>S2. The results of the oxygen-ionic conductivities measured by the above-mentioned method are shown in Table 1.

TABLE 1

| General name | Composition | Oxygen ion conductivity/ Scm$^{-1}$ | |
|---|---|---|---|
| | | 1000° C. | 700° C. |
| SSZ | 90 mol % $ZrO_2$—10 mol % $Sc_2O_3$ | 0.35 | 0.065 |
| | 89 mol % $ZrO_2$—10 mol % $Sc_2O_3$—1 molCeO$_2$ | 0.39 | 0.075 |
| | 88 mol % $ZrO_2$—10 mol % $Sc_2O_3$—2 molCeO$_2$ | 0.38 | 0.073 |
| | 85 mol % $ZrO_2$ 10 mol % $Sc_2O_3$—5 molCeO$_2$ | 0.32 | 0.057 |
| | 89 mol % $ZrO_2$—10 mol % $Sc_2O_3$—1 molSm$_2O_3$ | 0.33 | 0.057 |
| | 89 mol % $ZrO_2$—10 mol % $Sc_2O_3$—1 molEr$_2O_3$ | 0.34 | 0.060 |
| | 89 mol % $ZrO_2$—10 mol % $Sc_2O_3$—1 molBi$_2O_3$ | 0.38 | 0.072 |
| | 88 mol % $ZrO_2$—10 mol % $Sc_2O_3$—2 molBi$_2O_3$ | 0.36 | 0.065 |
| | 89 mol % $ZrO_2$—10 mol % $Sc_2O_3$—0.5 molBi$_2O_3$—0.5 molCeO$_2$ | 0.36 | 0.067 |

TABLE 1-continued

| General name | Composition | Oxygen ion conductivity/ $Scm^{-1}$ | |
|---|---|---|---|
| | | 1000° C. | 700° C. |
| | 89 mol % $ZrO_2$ 10 mol % $Sc_2O_3$—0.5 mol$Bi_2O_3$—0.25 mol$Y_2O_3$—0.25 mol$CeO_2$ | 0.36 | 0.065 |
| | 89 mol % $ZrO_2$—10 mol % $Sc_2O_3$—0.5 mol$Bi_2O_3$—0.5 mol $Y_2O_3$ | 0.34 | 0.062 |
| | 96 mol % $ZrO_2$—4 mol % $Sc_2O_3$ | 0.12 | 0.022 |
| ScYSZ | 90 mol % $ZrO_2$—8 mol % $Sc_2O_3$—2 mol % $Y_2O_3$ | 0.31 | 0.054 |
| | 89 mol % $ZrO_2$—10 mol % $Sc_2O_3$—1 mol$Y_2O_3$ | 0.35 | 0.065 |
| | 89 mol % $ZrO_2$—8 mol % $Sc_2O_3$—2 mol % $Y_2O_3$—1 mol$CeO_2$ | 0.34 | 0.062 |
| | 90 mol % $ZrO_2$—5 mol % $Sc_2O_3$—5 mol % $Y_2O_3$ | 0.23 | 0.040 |
| SSZ/YSZ | 90 mol % $ZrO_2$—10 mol % $Sc_2O_3$/90 mol % $ZrO_2$—10 mol % $Y_2O_3$ = 80/20 | 0.30 | 0.053 |
| YSZ | 90 mol % $ZrO_2$—10 mol % $Sc_2O_3$/90 mol % $ZrO_2$—10 mol % $Y_2O_3$ = 50/50 | 0.23 | 0.040 |
| | 92 mol % $ZrO_2$—8 mol % $Y_2O_3$ | 0.17 | 0.019 |
| | 90 mol % $ZrO_2$—10 mol % $Y_2O_3$ | 0.14 | 0.014 |
| | 88 mol % $ZrO_2$—12 mol % $Y_2O_3$ | 0.11 | 0.009 |
| Cerium oxide | 97 mol % $ZrO_2$—3 mol % $Y_2O_3$ | 0.06 | 0.003 |
| | $(CeO_2)_{0.9}(Gd_2O_3)_{0.05}$ | 0.35 | 0.071 |
| | $(CeO_2)_{0.8}(Gd_2O_3)_{0.1}$ | 0.36 | 0.072 |
| | $(CeO_2)_{0.7}(Gd_2O_3)_{0.15}$ | 0.32 | 0.060 |
| | $(CeO_2)_{0.8}(Sm_2O_3)_{0.1}$ | 0.35 | 0.070 |
| | $(CeO_2)_{0.8}(Y_2O_3)_{0.1}$ | 0.26 | 0.045 |
| Lanthanum gallate | $La_{0.8}Sr_{0.2}Ga_{0.8}Mg_{0.115}Co_{0.085}O_3$ | 0.59 | 0.139 |
| | $La_{0.8}Sr_{0.2}Ga_{0.8}Mg_{0.2}O_3$ | 0.45 | 0.100 |

The second layer in the electrolyte membrane of the present invention is not specifically limited, and may be composed of the material having a certain degree of oxygen-ionic conductivity (e.g., 0.01 $Scm^{-1}$ or more at 1000° C.), and containing at least zirconia. Zirconia doped with a rare-earth oxide other than yttria and scandia may also be used. However, in order to obtain more excellent performance than the case where the electrolyte membrane is formed of a material having high oxygen-ionic conductivity alone, it is more preferable that the material has excellent sintering properties. The reason is that an electrolyte membrane free of gas permeability can be sintered at a low temperature in a case where the material has excellent sintering properties. For example, when $LaAMnO_3$ is used as the material of the air electrode, diffusion of manganese into the electrolyte membrane can be suppressed, and the output performance can be prevented from being deteriorated. From this point of view, a YSZ or SSZ material further doped with $Bi_2O_3$, or ScYSZ, SSZ/YSZ, or zirconia doped with erbia may also be used.

From the data in Table 1, the examples of the combination of the first and second layers in the electrolyte membrane of the present invention are as shown in Table 2.

TABLE 2

| Examples of combination | First layer | Second layer |
|---|---|---|
| 1 | 90 mol$ZrO_2$—10 mol % $Sc_2O_3$ | 90 mol % $ZrO_2$—10 mol % $Y_2O_3$ |
| 2 | 90 mol % $ZrO_2$—5 mol % $Sc_2O_3$—5 mol$Y_2O_3$ | 90 mol % $ZrO_2$—10 mol % $Y_2O_3$ |
| 3 | 89 mol % $ZrO_2$—10 mol % $Sc_2O_3$—1 mol$CeO_2$ | 90 mol % $ZrO_2$—10 mol % $Y_2O_3$ |
| 4 | $(CeO_2)_{0.8}(Gd_2O_3)_{0.1}$ | 90 mol % $ZrO_2$—10 mol % $Y_2O_3$ |
| 5 | $La_{0.8}Sr_{0.2}Ga_{0.8}Mg_{0.2}O_3$ | 90 mol % $ZrO_2$—10 mol % $Y_2O_3$ |
| 6 | 89 mol % $ZrO_2$—10 mol % $Sc_2O_3$—1 mol $CeO_2$ | $(CeO_2)_{0.8}(Sm_2O_3)_{0.1}$ |
| 7 | 90 mol % $ZrO_2$—10 mol % $Sc_2O_3$ | $(CeO_2)_{0.8}(Y_2O_3)_{0.1}$ |
| 8 | 90 mol % $ZrO_2$—8 mol % $Sc_2O_3$—2 mol$Y_2O_3$ | 90 mol % $ZrO_2$—5 mol % $Sc_2O_3$—5 mol$Y_2O_3$ |
| 9 | 89 mol % $ZrO_2$—10 mol % $Sc_2O_3$—1 mol $CeO_2$ | 90 mol % $ZrO_2$—5 mol % $Sc_2O_3$—5 mol$Y_2O_3$ |
| 10 | $(CeO_2)_{0.8}(Gd_2O_3)_{0.1}$ | 90 mol % $ZrO_2$—5 mol % $Sc_2O_3$—5 mol$Y_2O_3$ |
| 11 | $La_{0.8}Sr_{0.2}Ga_{0.8}Mg_{0.2}O_3$ | 90 mol % $ZrO_2$—5 mol % $Sc_2O_3$—5 mol$Y_2O_3$ |
| 12 | $La_{0.8}Sr_{0.2}Ga_{0.8}Mg_{0.2}O_3$ | 90 mol % $ZrO_2$—10 mol % $Sc_2O_3$ |
| 13 | $(CeO_2)_{0.8}(Gd_2O_3)_{0.1}$ | 85 mol % $ZrO_2$—10 mol % $Sc_2O_3$—5 mol$CeO_2$ |
| 14 | 90 mol % $ZrO_2$—10 mol % $Y_2O_3$ | 97 mol % $ZrO_2$ 3 mol % $Y_2O_3$ |

It is preferable that the material powder of the electrolyte membrane in the present invention can form a membrane free of gas permeability. More preferably, the material powder is controlled to have a BET value of 0.5 to 20 m$^2$g$^{-1}$, 3% diameter of 0.1 μm or more, 97% diameter of 2 μm or less, and an average particle diameter of about 0.3 to 1 μm. If the material powder controlled to the above ranges is used, even a combination of the electrolyte materials having low sintering properties can form an electrolyte membrane free of gas permeability. For example, even in the case where the first and second layers composed of $(CeO_2)_{0.8}(Gd_2O_3)_{0.1}$ and 85 mol % $ZrO_2$-10 mol % $Sc_2O_3$-5 mol % $CeO_2$ as shown thirteenth in Table 2, an electrolyte membrane free of gas permeability can be fabricated.

The BET value is a value measured using a Micromeritics FlowSorb II 2300 manufactured by Shimadzu Corporation. The particle-size distribution is a value measured using a Laser Diffraction Particle Size Analyzer SALD-2000 manufactured by Shimadzu Corporation. In addition, the average particle diameter is a median diameter (50% diameter) value measured using a Laser Diffraction Particle Size Analyzer SALD-2000 manufactured by Shimadzu Corporation.

Although the method for forming an electrolyte membrane in the present invention is not specifically limited, a slurry coating method, a screen printing method and a sheet adhering method are preferred from the viewpoint of high mass productivity and low costs.

The method for preparing the material of the electrolyte membrane in the present invention is not specifically limited. A co-precipitation method is generally used.

It is preferable that the air electrode in the present invention has high electronic conductivity and high oxygen-gas permeability, and can efficiently perform the reaction of Equation (1) in the air atmosphere of the solid oxide fuel cell. Preferable materials from this point of view include $LaAMnO_3$.

In order to efficiently perform the reaction of Equation (1) and improve the output performance, it is preferable to interpose an electrode reaction layer between the air electrode and the electrolyte membrane.

Since the electrode reaction layer is formed to efficiently perform the reaction of Equation (1) and improve the output performance, preferably this layer has high oxygen-ionic conductivity. More preferably, the electrode reaction layer further has electronic conductivity, so that the reaction of Equation (1) can be more promoted. Furthermore, it is preferable that the electrode reaction layer is composed of a material having a thermal expansion coefficient close to that of the material of the electrolyte membrane, low reactivity with the electrolyte membrane and the air electrode, and high adhesiveness. If the material fulfills all of these characteristics, high output characteristics can be obtained even at a low temperature of about 700° C. From such a point of view, the preferable materials include $LaAMnO_3$/SSZ.

In the present invention, when the composition of lanthanum manganite represented by $LaAMnO_3$ (A is either Ca or Sr) in the $LaAMnO_3$/SSZ of the electrode reaction layer is described as $(La_{1-x}A_x)_yMnO_3$, it is preferable that the values of x and y are within the ranges of $0.15 \leq x \leq 0.3$ and $0.97 \leq y \leq 1$ from electronic conductivity at 700° C. or above, the stability of the material, and the like.

The reason is that the electronic conductivity lowers in a case of x<0.15 or x>0.3, the reactivity rises and the activity of the electrode reaction layer lowers in a case of y<0.97, and the output performance of the cell lowers because reaction with zirconia forms an insulation layer represented by $La_2Zr_2O_7$ in a case of y>1.

The SSZ of the electrode reaction layer in the present invention may be further doped with an oxide of 5 mol % or less which is any one or more of $CeO_2$, $Sm_2O_3$, $Gd_2O_3$, $Bi_2O_3$ and $Y_2O_3$. It is preferable to contain these materials because improvement of the oxygen-ionic conductivity and/or the sintering properties can be expected.

In order to increase the electrode activity of the electrode reaction layer composed of $LaAMnO_3$/SSZ according to the present invention, a structure where the average particle diameter or the BET value of the material powder has a gradient can be used. For example, a structure where the average particle diameter is varied to 5 μm, 3 μm and 1 μm, or the BET value is varied to 1 m$^2$g$^{-1}$, 3 m$^2$g$^{-1}$, and 5 m$^2$g$^{-1}$ from the air-electrode side toward the electrolyte membrane can be used. In order to efficiently perform the reaction of Equation (1), it is preferred to make a gradient in the average particle diameter and the BET value.

In order to increase the electrode activity of the electrode reaction layer composed of $LaAMnO_3$/SSZ according to the present invention, a structure where the composition has a gradient can be used. For example, a structure where the ratio of $LaAMnO_3$/SSZ is varied to 80/20, 50/50 and 20/80 from the air-electrode side toward the electrolyte membrane can be used. In order to reduce the difference of the thermal expansion between the air-electrode and the electrolyte membrane and efficiently perform the reaction of Equation (1), it is preferred to make a gradient in the composition.

$LaAMnO_3$ of the electrode reaction layer composed of $LaAMnO_3$/SSZ in the present invention may be doped with Ce, Sm, Pr, Nd, Co, Al, Fe, Ni or Cr in order to improve the electronic conductivity and prevent the Mn component from diffusing into the electrolyte membrane. Particularly, Ni is preferable.

It is preferable that the amount of scandia in the SSZ of the electrode reaction layer composed of $LaAMnO_3$/SSZ in the present invention is 3 to 12 mol %. The reason is that the layer of this range has high oxygen-ionic conductivity. In order to increase oxygen-ionic conductivity, the amount of 8 to 12 mol % is more preferable.

$LaAMnO_3$/SSZ in the present invention may be further doped or mixed with a cerium-containing oxide. The reason is that if the $LaAMnO_3$/SSZ is doped or mixed with a cerium-containing oxide, it is possible to prevent the Mn component from diffusing into the electrolyte membrane, and a solid oxide fuel cell having excellent output performance and durability performance can be provided.

In order to prevent the Mn component from diffusing into the electrolyte membrane, a layer where $LaAMnO_3$ and a cerium-containing oxide are evenly mixed (hereafter referred to as $LaAMnO_3$/cerium-containing oxide) is preferable.

When lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B is composed of any one or more of Mg, Al, In; and C is any one or more of Co, Fe, Ni and Cr) is used as the first layer in the electrolyte membrane, since the diffusion of the Mn components is particularly large, it is preferable to use the air-electrode-side reaction layer that can suppress the diffusion of the Mn components such as the above-described $LaAMnO_3$/SSZ which is further doped or mixed with a cerium-containing oxide, or an $LaAMnO_3$/cerium-containing oxide.

The cerium-containing oxide is not specifically limited as far as it is an oxide containing cerium. A cerium-containing oxide represented by a general formula $(CeO_2)_{1-2x}(B_2O_3)_x$ (where B is any one of Sm, Gd and Y, and $0.05 \leq X \leq 0.15$) is preferable because it has high oxygen-ionic conductivity.

The method for preparing the material for LaAMnO$_3$/SSZ in the present invention is not specifically limited as far as it can satisfy favorable properties as an air-electrode-side reaction layer. The examples of the method include a co-precipitation method, a powder mixing method, a spray thermal decomposition method, and a sol-gel method.

In the present invention, when the composition of lanthanum manganite represented by LaAMnO$_3$ (A is either Ca or Sr) of the air electrode is described as (La$_{1-x}$A$_x$)$_y$MnO$_3$, it is preferable that the values of x and y are within the ranges of $0.15 \leq x \leq 0.3$ and $0.97 \leq y \leq 1$ from electronic conductivity at 700° C. or above, the stability of the material, and the like.

The reason is that the electronic conductivity lowers in a case of x<0.15 or x>0.3, the reactivity rises and the activity of the electrode reaction layer lowers in a case of y<0.97, and the output performance of the cell lowers because reaction with zirconia forms an insulation layer represented by La$_2$Zr$_2$O$_7$ in a case of y>1.

The lanthanum manganite in the air electrode may be doped with Ce, Sm, Gd, Pr, Nd, Co, Al, Fe, Ni or Cr in addition to Sr or Ca.

The method for preparing the material for the air electrode in the present invention is not specifically limited. The examples of the method include a powder mixing method, a co-precipitation method, a spray thermal decomposition method, and a sol-gel method.

It is preferable that the fuel electrode in the present invention has high electronic conductivity and high fuel-gas permeability, and can efficiently perform the reactions of Equation (2) and (3) in the fuel-gas atmosphere of the solid oxide fuel cell. Materials preferable in this point of view include a layer in which NiO and yttria-doped zirconia are evenly mixed (hereafter referred to as NiO/YSZ), and a layer in which NiO and a cerium-containing oxide are evenly mixed (hereafter referred to as NiO/cerium-containing oxide). NiO is reduced into Ni in the fuel-gas atmosphere of the solid oxide fuel cell, and the layers are converted to Ni/YSZ and Ni/cerium-containing oxide.

The cerium-containing oxide is not specifically limited as far as it is an oxide containing cerium. A cerium-containing oxide represented by a general formula (CeO$_2$)$_{1-2x}$(B$_2$O$_3$)$_x$ (where B is any one of Sm, Gd and Y, and $0.05 \leq X \leq 0.15$) is preferable because it has high oxygen-ionic conductivity.

In order to efficiently perform the reactions of Equations (2) and (3), and improve the output performance, it is preferable to form a fuel-electrode-side reaction layer between the electrolyte membrane and the fuel electrode.

In the present invention, as the fuel-electrode-side reaction layer when a zirconia-based material, such as yttria-doped zirconia, is used as the second layer of the electrolyte membrane, a layer in which NiO and scandia-doped zirconia which excel in both electronic conductivity and oxygen-ionic conductivity are evenly mixed (hereafter referred to as NiO/SSZ) is preferable. NiO is reduced into Ni in the fuel-gas atmosphere of the solid oxide fuel cell, and the layer is converted to Ni/SSZ. It is preferable that the ratio of NiO/SSZ is 10/90 to 50/50 by weight. The reason is that if the ratio is lower than 10/90, the electronic conductivity is excessively low, and on the other hand, if the ratio is higher than 50/50, the oxygen-ionic conductivity is excessively low.

It is preferable that the amount of scandia in the SSZ in the NiO/SSZ of the present invention is 3 to 12 mol %. This range enables high oxygen-ionic conductivity, and can promote the reactions of Equations (2) and (3). Since the oxygen-ionic conductivity is high even at a low temperature of about 700° C., a solid oxide fuel cell having high output performance even at a low temperature of about 700° C. can be provided.

The SSZ in the NiO/SSZ of the present invention may be further doped with at least one oxide of 5 mol % or less which is selected from a group of CeO$_2$, Sm$_2$O$_3$, Gd$_2$O$_3$, Er$_2$O$_3$, Y$_2$O$_3$, and Bi$_2$O$_3$. It is preferable that these materials are contained because improvement of the electronic conductivity as well as improvement of the oxygen-ionic conductivity can be expected.

In the present invention, as the fuel-electrode-side reaction layer when a cerium-containing oxide is used as the second layer in the electrolyte membrane, preferably a layer in which NiO and a cerium-containing oxide having excellent properties of both electronic conductivity and oxygen-ionic conductivity are evenly mixed (hereafter referred to as NiO/cerium-containing oxide) is used. NiO is reduced into Ni in the fuel-gas atmosphere of the solid oxide fuel cell, and the layer is converted to Ni/cerium-containing oxide. It is preferable that the ratio of the NiO/cerium-containing oxide is 10/90 to 50/50 by weight. The reason is that if the ratio is lower than 10/90, the electronic conductivity is excessively low, and on the other hand, if the ratio is higher than 50/50, the oxygen-ionic conductivity is excessively low.

The cerium-containing oxide is not specifically limited as far as it is an oxide containing cerium. A cerium-containing oxide represented by a general formula (CeO$_2$)$_{1-2x}$(C$_2$O$_3$)$_x$ (where C is any one of Sm, Gd, Y and La, and $0.05 \leq X \leq 0.15$) is preferable.

It is preferable that the fuel electrode in the present invention has high electronic conductivity in order to lower IR loss. From this point of view, it is preferable that the ratio of NiO/YSZ and NiO/cerium-containing oxide is 50/50 to 90/10 by weight. The reason is that if the ratio is lower than 50/50, the electronic conductivity is low, and on the other hand, if the ratio is higher than 90/10, the output performance is deteriorated due to aggregation of Ni particles.

The composition of the fuel electrode in the present invention can include NiO/SSZ, and a layer in which NiO and calcium-doped zirconia are evenly mixed (hereafter referred to NiO/CSZ) instead of NiO/YSZ and NiO/cerium-containing oxide. YSZ is preferable because YSZ is more inexpensive than SSZ. However, NiO/CSZ is most preferable from the viewpoint of the costs because CSZ is further inexpensive than YSZ. NiO/CSZ is also converted to Ni/CSZ in the fuel-gas atmosphere of the fuel cell.

The method for synthesizing the material for the fuel electrode in the present invention is not specifically limited as far as the materials for the fuel electrode such as NiO/SSZ and NiO/YSZ are evenly mixed. The examples include a co-precipitation method and a spray drying method.

It is preferable that the interconnector in the present invention has high electronic conductivity and free of gas permeability in the air atmosphere and the fuel-gas atmosphere of the power-generating temperature of the solid oxide fuel cell, and is stable not only in an oxidation atmosphere, but also in a reduction atmosphere. From this point of view, lanthanum chromite is most preferable.

Since lanthanum chromite is difficult to sinter, it is difficult to fabricate the interconnector having no gas permeability at a usual sintering temperature of the solid oxide fuel cell (1500° C. or below). In order to improve the sintering properties, it is preferable that lanthanum chromite doped with Ca, Sr or Mg. Ca-doped lanthanum chromite is most preferable because it is possible to manufacture a membrane having the highest sintering properties and being free of gas permeability at a similar temperature in the case of the other materials for solid oxide fuel cells.

The amount of Ca in lanthanum chromite to be used for the interconnector is not specifically limited. As the amount of Ca increases, the electronic conductivity becomes high. However, the stability of the material is deteriorated. Therefore, the amount of Ca is preferably 10 to 40 mol %.

The shape of the solid oxide fuel cell in the present invention is not specifically limited. A flat-plate type or a cylindrical type can be used. In the flat-plate type, the inter-connecter is referred to as a separator but has the same role as the inter-connecter. In the case of the separator, heat-resistant metal such as ferrite stainless steel can be used.

The solid oxide fuel cell according to the present invention can also be applied to a micro-tube type (outer diameter; 10 mm or less, preferably 5 mm or less).

EXAMPLES

Example 1

A cylindrical solid oxide fuel cell shown in FIG. 1 was used as a basic configuration. Specifically, the solid oxide fuel cell comprises an interconnector 2 and an electrolyte membrane 3 formed on a cylindrical air-electrode support 1, and a fuel electrode 4 formed on the electrolyte membrane 3 so as not to contact the interconnector 2. In Example 1, as shown in FIG. 2, the solid oxide fuel cell further comprises an electrode reaction layer formed between the air electrode and the electrolyte membrane, and a fuel-electrode-side reaction layer formed between the electrolyte membrane and the fuel electrode, in which the electrolyte membrane was composed of two layers.

(1) Fabrication of Air Electrode Support

The air electrode was composed of Sr-doped lanthanum manganite which is represented by a composition of $La_{0.75}Sr_{0.25}MnO_3$, and the material powder for the air electrode was prepared by a co-precipitation method and then heat-treated. The average particle diameter was 30 μm. The cylindrical body was fabricated by extrusion, and sintered at 1500° C. to form the air-electrode support 1.

(2) Formation of Electrode Reaction Layer

The electrode reaction layer was composed of $LaAMnO_3$/SSZ, and the composition and the weight ratio were $La_{0.75}Sr_{0.25}MnO_3$/90 mol % $ZrO_2$-10 mol % $Sc_2O_3$=50/50. Nitrate aqueous solutions of La, Sr, Mn, Zr and Sc were blended to have the above composition, and an oxalic acid was added to precipitate the composition. The material powder was obtained by drying and heat-treating the precipitate and the supernatant, and controlling the particle diameter. The average particle diameter was 2 μm. After mixing the powder for the electrode reaction layer of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 100 mPas. A film was formed from the slurry on the air-electrode support (outer diameter: 15 mm, thickness: 1.5 mm, effective length: 400 mm) using a slurry coating method, and sintered at 1400° C. The thickness was 20 μm.

(3) Preparation of Slurry for Electrolyte Membrane (First Layer)

The material for the first layer was SSZ, and the composition thereof was 90 mol % $ZrO_2$-10 mol % $Sc_2O_3$. $ZrO_2$ was dissolved in a concentrated nitric acid of 3N or more heated at 100° C., and diluted with distilled water to prepare a nitrate aqueous solution. A nitrate aqueous solution was prepared from $Sc_2O_3$ in the same manner. The nitrate aqueous solutions were blended to have the above composition, and an aqueous solution of an oxalic acid was added to cause co-precipitation. The material powder was obtained by drying the precipitate and the supernatant formed by co-precipitation at about 200° C., thermally decomposing at 500° C., and heat-treating at 800° C. for 10 hours. The average particle diameter was 0.5 μm. After mixing the material powder of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 140 mPas.

(4) Preparation of Slurry for Electrolyte Membrane (Second Layer)

The material for the second layer was YSZ, and the composition thereof was 90 mol % $ZrO_2$-10 mol % $Y_2O_3$. $ZrO_2$ was dissolved in a concentrated nitric acid of 3N or more heated at 100° C., and diluted with distilled water to prepare a nitrate aqueous solution. A nitrate aqueous solution was prepared from $Y_2O_3$ in the same manner. The nitrate aqueous solutions were blended to have the above composition, and an aqueous solution of an oxalic acid was added to cause co-precipitation. The material powder was obtained by drying the precipitate and the supernatant formed by co-precipitation at about 200° C., thermally decomposing at 500° C., and heat-treating at 800° C. for 10 hours. The average particle diameter was 0.5 μm. After mixing the material powder of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 140 mPas.

(5) Formation of Electrolyte Membrane

The first layer was formed on the above-described electrode reaction layer using a slurry coating method. Next, the second layer was formed using a slurry coating method. The layers were sintered at 1400° C. The thickness of the obtained electrolyte membrane was 30 μm (first layer: 15 μm, second layer: 15 μm). The area where the interconnector was formed in the subsequent step was masked so as not to be coated.

(6) Preparation of Slurry for Fuel-Electrode-Side Reaction Layer

The fuel-electrode-side reaction layer was composed of NiO/SSZ, and the composition was NiO/90 mol % $ZrO_2$-10 mol % $Sc_2O_3$. Nitrate aqueous solutions of Ni, Zr and Sc were blended to have the above composition, and an oxalic acid was added to precipitate the composition. The material was obtained by drying and heat-treating the precipitate and the supernatant, and controlling the particle diameter. Two types of layers having a weight ratio of NiO/90 mol % $ZrO_2$-10 mol % $Sc_2O_3$=20/80 and 50/50 were formed, both of which had an average particle diameter of 0.5 μm. After mixing the powder of 100 parts by weight, an organic solvent (ethanol) of 500 parts by weight, a binder (ethyl cellulose) of 10 parts by weight, a dispersant (polyoxyethylene alkyl phosphoric acid ester) of 5 parts by weight, an antifoaming agent (sorbitan sesquiolate) of 1 part by weight, and a plasticizer (DBP) of 5 parts by weight, the mixture was sufficiently agitated to prepare a slurry. The viscosity of the slurry was 70 mPas.

(7) Formation of Fuel-Electrode-Side Electrode Reaction Layer

The cell was masked so as to make the surface area of the fuel-electrode-side layer 150 cm$^2$, and NiO/90 mol % $ZrO_2$-10 mol % $Sc_2O_3$=20/80 (average particle diameter: 0.5 μm) and 50/50 (average particle diameter: 0.5 μm) were formed in this order on the electolytic membrane using a slurry coating method. The thickness of the layer (after sintering) was 10 μm.

(8) Preparation of Slurry for Fuel Electrode

The fuel electrode was composed of NiO/YSZ, and the composition was NiO/90 mol % $ZrO_2$-10 mol % $Y_2O_3$. Nitrate aqueous solutions of Ni, Zr and Y were blended to have the above composition, and an oxalic acid was added to precipitate the composition. The material was obtained by drying and heat-treating the precipitate and the supernatant, and controlling the particle diameter. The composition and the weight ratio were NiO/90 mol % $ZrO_2$-10 mol % $Y_2O_3$=70/30, and the average particle diameter was 2 μm. After mixing the powder of 100 parts by weight, a solvent (ethanol) of 500 parts by weight, a binder (ethyl cellulose) of 20 parts by weight, a dispersant (polyoxyethylene alkyl phosphoric acid ester) of 5 parts by weight, an antifoaming agent (sorbitan sesquiolate) of 1 part by weight, and a plasticizer (DBP) of 5 parts by weight, the mixture was sufficiently agitated to prepare a slurry. The viscosity of the slurry was 250 mPas.

(9) Fabrication of Fuel Electrode

The fuel electrode was fabricated on the fuel-electrode-side reaction layer using a slurry coating method. The thickness of the film (after sintering) was 90 μm. Furthermore, the fuel-electrode-side reaction layer and the fuel electrode were sintered together at 1400° C.

(10) Fabrication of Interconnector

The interconnector was composed of Ca-doped lanthanum chromite which is represented by $La_{0.80}Ca_{0.20}CrO_3$. After preparing the lanthanum chromite using a spray pyrolysis method, heat treatment was performed to prepare the material powder. The average particle diameter of the obtained powder was 1 μm. After mixing the powder of 40 parts by weight, a solvent (ethanol) of 100 parts by weight, a binder (ethyl cellulose) of 2 parts by weight, a dispersant (polyoxyethylene alkyl phosphoric acid ester) of 1 part by weight, and an antifoaming agent (sorbitan sesquiolate) of 1 part by weight, the mixture was sufficiently agitated to prepare a slurry. The viscosity of the slurry was 100 mPas. The interconnector was formed using a slurry coating method, and sintered at 1400° C. The thickness after sintering was 40 μm.

Example 2

A solid oxide fuel cell was fabricated in the same manner as in Example 1 except that the material for the first layer was ScYSZ, and the composition was 90 mol % $ZrO_2$-5 mol % $Sc_2O_3$-5 mol % $Y_2O_3$.

Example 3

A solid oxide fuel cell was fabricated in the same manner as in Example 1 except that the material for the first layer was SSZ/YSZ, and the composition and the ratio were 90 mol % $ZrO_2$-10 mol % $Sc_2O_3$/90 mol % $ZrO_2$-10 mol % $Y_2O_3$=50/50; and the slurry was formed by adding 90 mol % $ZrO_2$-10 mol % $Sc_2O_3$ powder of 20 parts by weight having an average particle diameter of 0.5 μm prepared by the above-described co-precipitation method, and 90 mol % $ZrO_2$-10 mol % $Y_2O_3$ powder of 20 parts by weight having an average particle diameter of 0.5 μm prepared by the above-described co-precipitation method.

Example 4

A solid oxide fuel cell was fabricated in the same manner as in Example 1 except that the material for the first layer was SSZ, and the composition was 89 mol % $ZrO_2$-10 mol % $Sc_2O_3$-1 mol % $CeO_2$.

Example 5

A solid oxide fuel cell was fabricated in the same manner as in Example 1 except that the material for the first layer was SSZ, and the composition was 89 mol % $ZrO_2$-10 mol % $Sc_2O_3$-0.5 mol % $Bi_2O_3$-0.5 mol % $CeO_2$.

Example 6

A solid oxide fuel cell was fabricated in the same manner as in Example 1 except that the material for the second layer was ScYSZ, and the composition was 90 mol % $ZrO_2$-5 mol % $Sc_2O_3$-5 mol % $Y_2O_3$.

Example 7

A solid oxide fuel cell was fabricated in the same manner as in Example 1 except that the material for the first layer was ScYSZ, and the composition was 90 mol % $ZrO_2$-8 mol % $Sc_2O_3$-2 mol % $Y_2O_3$; and the material for the second layer was ScYSZ, and the composition was 90 mol % $ZrO_2$-5 mol % $Sc_2O_3$-5 mol % $Y_2O_3$.

Comparative Example 1

A solid oxide fuel cell was fabricated in the same manner as in Example 1 except that the electrolyte membrane was comprised of a first layer alone whose composition was 90 mol % $ZrO_2$-10 mol % $Y_2O_3$, and the thickness was 30 μm.

Power Generation Test

A power generation test was conducted using cells fabricated in Examples 1 to 7 and Comparative Example 1 (effective area of fuel electrode: 150 cm$^2$). The operating conditions of the test were as follows:

Fuel: ($H_2$+11% $H_2O$):$N_2$=1:2
Oxidant: Air
Power generating temperature: 800° C.
Current density: 0.3 Acm$^{-2}$ Gas Leakage Test Nitrogen gas was flowed into the air electrode support of each cell fabricated in Examples 1 to 7 and Comparative Example 1, pressure of 0.1 MPa was supplied from the air electrode, and the amount of the gas permeated the electrolyte membrane was measured. With this test, the gas permeability of the electrolyte membrane was evaluated.

TABLE 3

|  | Potential (V) | Gas permeation amount Q ($\times 10^{-10}$ ms$^{-1}$Pa$^{-1}$) |
|---|---|---|
| Example 1 | 0.66 | 1.5 |
| Example 2 | 0.65 | 0.8 |
| Example 3 | 0.65 | 0.6 |
| Example 4 | 0.68 | 2.2 |

TABLE 3-continued

| | Potential (V) | Gas permeation amount Q ($\times 10^{-10}$ ms$^{-1}$Pa$^{-1}$) |
|---|---|---|
| Example 5 | 0.67 | 1.3 |
| Example 6 | 0.67 | 1.0 |
| Example 7 | 0.66 | 0.8 |
| Comparative Example 1 | 0.57 | 1.5 |

Table 3 shows the results of the potentials in the power generation test and the gas permeation amount of the electrolyte membrane. The gas permeation amount Q in Examples 1 to 7 and Comparative Example 1 was within the more preferable range of $2.8 \times 10^{-10}$ ms$^{-1}$Pa$^{-1}$ or less, and it was confirmed that there is no problem about the gas permeability of the electrolyte membrane. As for the generated potential, it was 0.6 V or more in Examples 1 to 7, while it was 0.57 V in Comparative Example 1 which is evidently low. From the above results, it was confirmed that a solid oxide fuel cell having excellent output performance can be provided by forming the first and second layers in the electrolyte membrane with SSZ and YSZ, ScYSZ and YSZ; SSZ/YSZ and YSZ, SSZ and ScYSZ, or ScYSZ and ScYSZ, and adjusting the amount of scandia in the first layer to be larger.

As shown in Examples 4 and 5 and Table 1, it was confirmed that the use of SSZ further doped with at least one oxide of 5 mol/% or less which is selected from a group consisting of $CeO_2$, $Sm_2O_3$, $Gd_2O_3$, $Yb_2O_3$, $Er_2O_3$, and $Bi_2O_3$, was more preferable because the power generating performance was improved and the gas permeability of the electrolyte membrane was reduced.

Example 8

A solid oxide fuel cell was fabricated in the same manner as in Example 1 except that the material for the second layer in the electrolyte membrane was ScYSZ, and the composition was 90 mol % $ZrO_2$-5 mol % $Sc_2O_3$-5 mol % $Y_2O_3$; and the material for the first layer was $(CeO_2)_{0.8}(Sm_2O_3)_{0.1}$ which was prepared by the above-described co-precipitation method and had an average particle diameter of 0.5 μm, and the sintering temperature was 1430° C.

Example 9

A solid oxide fuel cell was fabricated in the same manner as in Example 1 except that the material for the second layer in the electrolyte membrane was YSZ, and the composition was 90 mol % $ZrO_2$-10 mol % $Y_2O_3$.

Example 10

A solid oxide fuel cell was fabricated in the same manner as in Example 1 except that the material for the second layer was YSZ, and the composition was 90 mol % $ZrO_2$-10 mol % $Y_2O_3$; the material for the first layer was $La_{0.8}Sr_{0.2}Ga_{0.8}Mg_{0.2}O_3$ which was prepared by blending $La_2O_3$, $SrCO_3$, $Ga_2O_3$ and MgO so as to have the above-described composition, mixing in a ball mill, performing heat treatment at 1200° C., and grinding so as to adjust the average particle diameter to be 0.5 μm; and the material powder for the electrode reaction layer was prepared by mixing the powder of $La_{0.75}Sr_{0.25}MnO_3$, 90 mol % $ZrO_2$-10 mol % $Sc_2O_3$, and $(CeO_2)_{0.8}(Sm_2O_3)_{0.1}$, performing heat treatment, and grinding so as to control the average particle diameter to be 2 μm, in which the weight ratio was $La_{0.75}Sr_{0.25}MnO_3$/90 mol % $ZrO_2$-10 mol % $Sc_2O_3$/$(CeO_2)_{0.8}(Sm_2O_3)_{0.1}$=40/40/20.

Example 11

A solid oxide fuel cell was fabricated in the same manner as in Example 10 except that the material for the second layer was SSZ, and the composition was 89 mol % $ZrO_2$-10 mol % $Sc_2O_3$-1 mol % $CeO_2$.

Example 12

A solid oxide fuel cell was fabricated in the same manner as in Example 10 except that the material for the second layer was SSZ, and the composition was 89 mol % $ZrO_2$-10 mol % $Sc_2O_3$-1 mol % $CeO_2$; and the material for the first layer was $La_{0.8}Sr_{0.2}Ga_{0.8}Mg_{0.115}Co_{0.085}O_3$.

Comparative Example 2

A solid oxide fuel cell was fabricated in the same manner as in Example 1 except that the electrolyte membrane was composed of $(CeO_2)_{0.8}(Sm_2O_3)_{0.1}$ alone, the sintering temperature was 1430° C., and the thickness was 30 μm; the material for fuel-electrode-side reaction layer and the fuel electrode was NiO/cerium-containing oxide whose composition was $NiO/(CeO_2)_{0.8}(Sm_2O_3)_{0.1}$ which was prepared by blending nitrate aqueous solutions of Ni, Ce and Sm so as to have the above composition, adding an oxalic acid to precipitate the composition, drying and heat-treating the precipitate and the supernatant, and controlling the particle diameter; two types of compositions and weight ratios of $NiO/(CeO_2)_{0.8}(Sm_2O_3)_{0.1}$=20/80 and 50/50 were prepared for the fuel-electrode-side reaction layer, and the average particle diameter was both 0.5 μm; and the composition and the weight ratio of the fuel electrode were $NiO/(CeO_2)_{0.8}(Sm_2O_3)_{0.1}$=70/30.

Comparative Example 3

A solid oxide fuel cell was fabricated in the same manner as in Example 1 except that the electrolyte membrane was composed of $La_{0.8}Sr_{0.2}Ga_{0.8}Mg_{0.2}O_3$ alone, and the thickness was 30 μm; the material powder for the electrode reaction layer was prepared by mixing the powder of $La_{0.75}Sr_{0.25}MnO_3$, 90 mol % $ZrO_2$-10 mol % $Sc_2O_3$, and $(CeO_2)_{0.8}(Sm_2O_3)_{0.1}$, performing heat treatment, grinding so as to control the average particle diameter to be 2 μm, in which the weight ratio was $La_{0.75}Sr_{0.25}MnO_3$/90 mol % $ZrO_2$-10 mol % $Sc_2O_3$/$(CeO_2)_{0.8}(Sm_2O_3)_{0.1}$=40/40/20; and the material for fuel-electrode-side reaction layer and the fuel electrode was NiO/cerium-containing oxide whose composition was $NiO/(CeO_2)_{0.8}(Sm_2O_3)_{0.1}$ which was prepared by blending nitrate aqueous solutions of Ni, Ce and Sm so as to have the above composition, adding an oxalic acid to precipitate the composition, drying and heat-treating the precipitate and the supernatant, and controlling the particle diameter; two types of compositions and weight ratios of $NiO/(CeO_2)_{0.8}(Sm_2O_3)_{0.1}$=20/80 and 50/50 were prepared for the fuel-electrode-side reaction layer, and the average particle diameter was both 0.5 μm; the composition and the weight ratio of the fuel electrode were $NiO/(CeO_2)_{0.8}(Sm_2O_3)_{0.1}$=70/30; and the fuel-electrode-side reaction layer and the fuel electrode were sintered together at 1350° C.

Power Generation Test

A power generation test was conducted using cells fabricated in Examples 8 to 12 and Comparative Examples 2 and 3 (effective area of fuel electrode: 150 cm$^2$). The operating conditions of the test were as follows:

Fuel: (H$_2$+11% H$_2$O):N$_2$=1:2
Oxidant: Air
Power generating temperature: 800° C.
Current density: 0.3 Acm$^{-2}$ Gas Leakage Test Nitrogen gas was flowed into the air electrode support of each cell fabricated in Examples 8 to 12 and Comparative Examples 2 and 3, pressure of 0.1 MPa was supplied from the air electrode, and the amount of the gas permeated the electrolyte membrane was measured. With this test, the gas permeability of the electrolyte membrane was evaluated.

TABLE 4

|  | Potential (V) | Gas permeation amount Q (×10$^{-10}$ ms$^{-1}$Pa$^{-1}$) |
| --- | --- | --- |
| Example 8 | 0.67 | 2.5 |
| Example 9 | 0.64 | 3.1 |
| Example 10 | 0.63 | 2.8 |
| Example 11 | 0.67 | 3.7 |
| Example 12 | 0.66 | 2.7 |
| Comparative Example 2 | 0.10 | 4.5 |
| Comparative Example 3 | 0.30 | 1.2 |

Table 4 shows the results of the potentials in the power generation test and the gas permeation amount of the electrolyte membrane. The gas permeation amount Q in Examples 8, 10, 12 and Comparative Example 3 was within the more preferable range of 2.8×10$^{-10}$ ms$^{-1}$Pa$^{-1}$ or less, the gas permeation amount Q in Examples 9, 11 and Comparative Example 2 was within the preferable range of 2.8×10$^{-9}$ ms$^{-1}$Pa$^{-1}$ or less, and it was confirmed that there is no problem about the gas permeability of the electrolyte membrane. As for the generated potential, it was 0.6 V or more in Examples 8 to 12, while it was 0.1 V in Comparative Example 2 and it was 0.3 V in Comparative Example 3, which are extremely low. This is because the cerium-containing oxide had electronic conductivity due to exposure to an oxidation-reduction atmosphere and the electromotive force was significantly lowered in the case of (CeO$_2$)$_{0.8}$(Sm$_2$O$_3$)$_{0.1}$ alone; and Mn from the air-electrode-side reaction layer and the air electrode is incorporated in La$_{0.8}$Sr$_{0.2}$Ga$_{0.8}$Mg$_{0.2}$O$_3$, which caused electronic conductivity and lowered the electromotive force in the case of La$_{0.8}$Sr$_{0.2}$Ga$_{0.8}$Mg$_{0.2}$O$_3$. In contrast, as shown in Examples 8 to 12, it was confirmed that by forming a second electrolytic layer containing at least zirconia on the fuel-electrode side, the lowering of electromotive force was suppressed, and a solid oxide fuel cell having excellent output performance was provided.

From the results of Examples 1 to 12 and Comparative Examples 1 to 3, it was confirmed that by making the electrolyte membrane on the fuel-electrode side comprise a second layer composed of at least a zirconia-containing material and a first layer composed of a material having higher oxygen-ionic conductivity than that of the second layer, a solid oxide fuel cell having excellent output performance was provided.

Example 13

A solid oxide fuel cell was fabricated in the same manner as in Example 1 except that the material for the second layer was (CeO$_2$)$_{0.8}$(Sm$_2$O$_3$)$_{0.1}$, the material for the first layer was SSZ and the composition was 89 mol % ZrO$_2$-10 mol % Sc$_2$O$_3$-1 mol % CeO$_2$, and sintered at 1420° C.; the composition of the fuel-electrode-side reaction layer was NiO/(CeO$_2$)$_{0.8}$(Sm$_2$O$_3$)$_{0.1}$ which was prepared by blending nitrate aqueous solutions of Ni, Ce and Sm so as to have the above composition, adding an oxalic acid to precipitate the composition, drying and heat-treating the precipitate and the supernatant, and controlling the particle diameter; two types of compositions and weight ratios NiO/(CeO$_2$)$_{0.8}$(Sm$_2$O$_3$)$_{0.1}$=20/80 and 50/50 were prepared for the fuel-electrode-side reaction layer, and the average particle diameter was both 0.5 μm; and the fuel electrode was NiO(CeO$_2$)$_{0.8}$(Sm$_2$O$_3$)$_{0.1}$ which was prepared by blending nitrate aqueous solutions of Ni, Ce and Sm so as to have the above composition, adding an oxalic acid to precipitate the composition, drying and heat-treating the precipitate and the supernatant, and controlling the particle diameter; and the composition and the weight ratio of the fuel electrode was NiO/(CeO$_2$)$_{0.8}$(Sm$_2$O$_3$)$_{0.1}$=70/30, and the average particle diameter was 2 μm.

Example 14

A solid oxide fuel cell was fabricated in the same manner as in Example 13 except that the material for the second layer was (CeO$_2$)$_{0.8}$(Y$_2$O$_3$)$_{0.1}$, and the material for the first layer was 89 mol % ZrO$_2$-10 mol % Sc$_2$O$_3$-0.5 mol % Bi$_2$O$_3$-0.5 mol % Y$_2$O$_3$, and sintered at 1420° C.

Example 15

A solid oxide fuel cell was fabricated in the same manner as in Example 13 except that the material for the second layer was (CeO$_2$)$_{0.8}$(Y$_2$O$_3$)$_{0.1}$, and the material for the first layer was 90 mol % ZrO$_2$-10 mol % Sc$_2$O$_3$, and sintered at 1420° C.

Power Generation Test

A power generation test was conducted using cells fabricated in Examples 13 to 15 and Comparative Example 2 (effective area of fuel electrode: 150 cm$^2$). The operating conditions of the test were as follows:

Fuel: (H$_2$+11% H$_2$O):N$_2$=1:2
Oxidant: Air
Power generating temperature: 800° C.
Current density: 0.3 Acm$^{-2}$ Gas Leakage Test Nitrogen gas was flowed into the air electrode support of each cell fabricated in Examples 13 to 15 and Comparative Example 2, pressure of 0.1 MPa was supplied from the air electrode, and the amount of the gas permeated the electrolyte membrane was measured. With this test, the gas permeability of the electrolyte membrane was evaluated.

TABLE 5

|  | Potential (V) | Gas permeation amount Q (×10$^{-10}$ ms$^{-1}$Pa$^{-1}$) |
| --- | --- | --- |
| Example 13 | 0.66 | 4.3 |
| Example 14 | 0.62 | 2.1 |
| Example 15 | 0.62 | 4.7 |
| Comparative Example 2 | 0.10 | 4.5 |

Table 5 shows the results of the potentials in the power generation test and the gas permeation amount of the electrolyte membrane. The gas permeation amount Q in Example 14 was within the more preferable range of 2.8×10$^{-10}$ ms$^{-1}$Pa$^{-1}$ or less, the gas permeation amount Q in Examples 13, 15 and Comparative Example 2 was within the preferable range of $2.8\times10^{-9}$ ms$^{-1}$Pa$^{-1}$ or less, and it was confirmed that there is no problem about the gas permeability of the electrolyte membrane. As for the generated potential, it was 0.6 V or more in Examples 13 to 15, while it was 0.10 V in Comparative Example 2, which is extremely low. This is because the cerium-containing oxide had electronic conductivity due to exposure to an oxidation-reduction atmosphere and the electromotive force was significantly lowered in the case of $(CeO_2)_{0.8}(Gd_2O_3)_{0.1}$ alone. In contrast, as shown in Examples 13 to 15, it was confirmed that by using a material consisting of zirconia doped with at least scandia and having higher oxygen-ionic conductivity than the cerium-containing oxide on the air-electrode side, the output performance was significantly improved. From the above results, it was assumed that high output performance was also obtained when the second layer was composed of $(CeO_2)_{0.9}(Gd_2O_3)_{0.05}$, $(CeO_2)_{0.8}(Gd_2O_3)_{0.1}$, and $(CeO_2)_{0.7}(Gd_2O_3)_{0.15}$ shown in Table 1. With this, it was confirmed that the second layer of the electrolyte membrane composed of a cerium-containing oxide represented by a general formula $(CeO_2)_{1-2x}(B_2O_3)_x$ (where B is any one of Sm, Gd and Y, $0.05 \leq X \leq 0.15$) and the first layer of the electrolyte membrane composed of an SSZ material.

Thickness Ratio of First Layer in Electrolyte Membrane (the Case where the Air-Electrode Side is a Material Containing Zirconia such as SSZ)

Example 16

A solid oxide fuel cell was fabricated in the same manner as in Example 1 except that the thickness of the first layer was 1 μm, and the thickness of the second layer was 29 μm.

Example 17

A solid oxide fuel cell was fabricated in the same manner as in Example 1 except that the thickness of the first layer was 1.5 μm, and the thickness of the second layer was 28.5 μm.

Example 18

A solid oxide fuel cell was fabricated in the same manner as in Example 1 except that the thickness of the first layer was 6 μm, and the thickness of the second layer was 24 μm.

Example 19

A solid oxide fuel cell was fabricated in the same manner as in Example 1 except that the thickness of the first layer was 9 μm, and the thickness of the second layer was 21 μm.

Example 20

A solid oxide fuel cell was fabricated in the same manner as in Example 1 except that the thickness of the first layer was 24 μm, and the thickness of the second layer was 6 μm.

Example 21

A solid oxide fuel cell was fabricated in the same manner as in Example 1 except that the thickness of the first layer was 27 μm, and the thickness of the second layer was 3 μm.

Example 22

A solid oxide fuel cell was fabricated in the same manner as in Example 1 except that the thickness of the first layer was 28 μm, and the thickness of the second layer was 2 μm.

Comparative Example 4

A solid oxide fuel cell was fabricated in the same manner as in Example 1 except that the electrolyte membrane was composed of 90 mol % $ZrO_2$-10 mol % $Sc_2O_3$ alone, the thickness was 30 μm, and the sintering temperature was 1420° C.

Power Generation Test

A power generation test was conducted using cells fabricated in Examples 1, 16 to 22 and Comparative Examples 1 and 4 (effective area of fuel electrode: 150 cm$^2$). The operating conditions of the test were as follows:

Fuel: ($H_2$+11% $H_2O$):$N_2$=1:2
Oxidant: Air
Power generating temperature: 800° C.
Current density: 0.3 Acm$^{-2}$ Gas Leakage Test Nitrogen gas was flowed into the air electrode support of each cell fabricated in Examples 1, 16 to 22 and Comparative Examples 1 and 4, pressure of 0.1 MPa was supplied from the air electrode, and the amount of the gas permeated the electrolyte membrane was measured. With this test, the gas permeability of the electrolyte membrane was evaluated.

TABLE 6

| | Thickness ratio of first layer (%) | Generated potential (V) | Gas Permeation amount Q ($\times10^{-10}$ ms$^{-1}$Pa$^{-1}$) |
|---|---|---|---|
| Example 1 | 50 | 0.66 | 1.5 |
| Example 16 | 3.3 | 0.58 | 0.8 |
| Example 17 | 5 | 0.60 | 0.8 |
| Example 18 | 20 | 0.63 | 1.1 |
| Example 19 | 30 | 0.66 | 1.2 |
| Example 20 | 80 | 0.67 | 2.5 |
| Example 21 | 90 | 0.67 | 3.5 |
| Example 22 | 93.3 | 0.66 | 4.7 |
| Comparative Example 1 | 0 | 0.57 | 1.5 |
| Comparative Example 4 | 100 | 0.65 | 7.8 |

Table 6 shows the results of the generated potentials of the cells and the gas permeation amount of the electrolyte membrane when the thickness of the first layer was varied. It was confirmed that the generated potentials were all higher than the potential of Comparative Example 1, and that the output performance was improved by laminating the first layer. Although the generated potential in Example 16 was substantially the same as that of Comparative Example 1, the potential sharply rose when the thickness of the first layer was increased to 5% in Example 17, and the potential continued to rise as the thickness of the first layer was increased to 80%. However, the potential was not improved in the case of 80% or more. As for the gas permeability, although the gas permeation amount Q was within the preferable range of $2.8\times10^{-9}$ ms$^{-1}$Pa$^{-1}$ or less, there was a tendency for the gas permeation amount to increase as the first layer was increased. From the above results, the effect of potential improvement was small when the first layer was less than 5%, and the potential was no longer improved even when the first layer was more than 90%, which means that an expensive SSZ material is wasted. Therefore, it was confirmed that the thickness of the first layer was preferably 5 to 90% with respect to the total thickness of the electrolyte membrane. In addition, from the results of the generated potential and the gas permeation amount, it was confirmed that the thickness of the first layer was preferably within the range of 30 to 80%.

Thickness Ratio of First Layer in Electrolyte Membrane (the Case where the Cerium-Containing Oxide is Used on the Air-Electrode Side)

Example 23

A solid oxide fuel cell was fabricated in the same manner as in Example 13 except that the thickness of the first layer was 1.5 μm, and the thickness of the second layer was 28.5 μm.

Example 24

A solid oxide fuel cell was fabricated in the same manner as in Example 13 except that the thickness of the first layer was 3 μm, and the thickness of the second layer was 27 μm.

Example 25

A solid oxide fuel cell was fabricated in the same manner as in Example 13 except that the thickness of the first layer was 6 μm, and the thickness of the second layer was 24 μm.

Example 26

A solid oxide fuel cell was fabricated in the same manner as in Example 13 except that the thickness of the first layer was 9 μm, and the thickness of the second layer was 21 μm.

Example 27

A solid oxide fuel cell was fabricated in the same manner as in Example 13 except that the thickness of the first layer was 24 μm, and the thickness of the second layer was 6 μm.

Example 28

A solid oxide fuel cell was fabricated in the same manner as in Example 13 except that the thickness of the first layer was 27 μm, and the thickness of the second layer was 3 μm.

Example 29

A solid oxide fuel cell was fabricated in the same manner as in Example 13 except that the thickness of the first layer was 28 μm, and the thickness of the second layer was 2 μm.

Power Generation Test

A power generation test was conducted using cells fabricated in Examples 13, 23 to 29 and Comparative Examples 2 and 4 (effective area of fuel electrode: 150 cm$^2$). The operating conditions of the test were as follows:

Fuel: ($H_2$+11% $H_2O$): $N_2$=1:2
Oxidant: Air
Power generating temperature: 800° C.
Current density: 0.3 Acm$^{-2}$

Gas Leakage Test

Nitrogen gas was flowed into the air electrode support of each cell fabricated in Examples 13, 23 to 29 and Comparative Examples 2 and 4, pressure of 0.1 MPa was supplied from the air electrode, and the amount of the gas permeated the electrolyte membrane was measured. With this test, the gas permeability of the electrolyte membrane was evaluated.

TABLE 7

| | Thickness ratio of first layer (%) | Generated potential (V) | Gas Permeation amount Q (×10$^{-10}$ ms$^{-1}$ Pa$^{-1}$) |
|---|---|---|---|
| Example 13 | 50 | 0.66 | 4.3 |
| Example 23 | 5 | 0.30 | 7.5 |
| Example 24 | 10 | 0.59 | 7.0 |
| Example 25 | 20 | 0.62 | 6.5 |
| Example 26 | 30 | 0.65 | 5.3 |
| Example 27 | 80 | 0.67 | 5.2 |
| Example 28 | 90 | 0.66 | 5.8 |
| Example 29 | 93.3 | 0.65 | 7.2 |
| Comparative Example 2 | 0 | 0.10 | 4.5 |
| Comparative Example 4 | 100 | 0.65 | 7.8 |

Table 7 shows the results of the generated potentials of the cells and the gas permeation amount of the electrolyte membrane when the thickness of the first layer was varied. It was confirmed that the generated potentials were all higher than the potential of Comparative Example 2, and that the output performance was improved by laminating the first layer. Although the generated potential in Example 23 was low, the potential sharply rose when the thickness of the first layer was increased to 10% in Example 24, and the potential continued to rise as the thickness of the first layer was increased to 80%. However, the potential was not improved in the case of 80% or more. As for the gas permeability, although the gas permeation amount Q was within the preferable range of 2.8×10$^{-9}$ ms$^{-1}$Pa$^{-1}$ or less, but not within the more preferable range of 2.8×10$^{-10}$ ms$^{-1}$Pa$^{-1}$ or less, and the gas permeation amount was higher than the case where the YSZ material was contained. From the above results, the effect of potential improvement was small when the first layer was less than 10%, and the potential was no longer improved when the first layer was more than 90%, which means that an expensive SSZ material is wasted. Therefore, it was confirmed that the thickness of the first layer was preferably 10 to 90% with respect to the total thickness of the electrolyte membrane. In addition, from the results of the generated potential and the gas permeation amount, it was confirmed that the thickness of the first layer was more preferably within the range of 30 to 80%.

Power Generation Test

Figure 3:
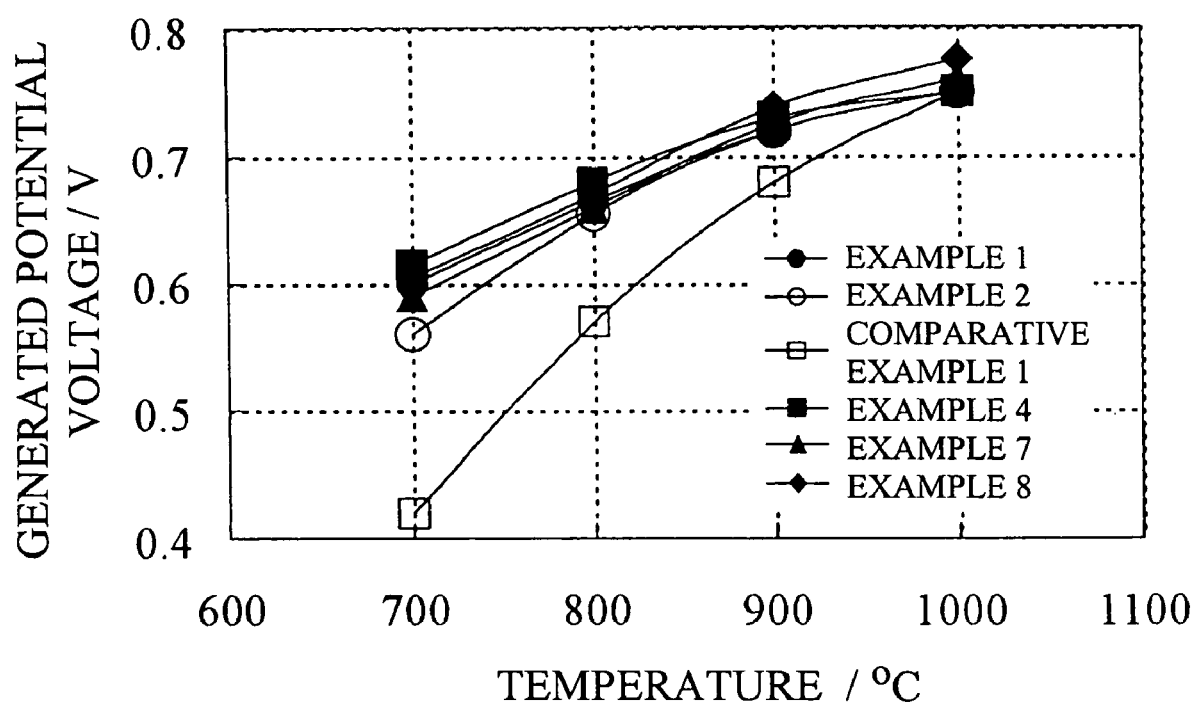
FIG. 3 is a graph showing the relationship between the power generating temperature (x-axis) and the generated potential of a test cell (y-axis).

A power generation test was conducted using cells fabricated in Examples 1, 2, 4, 7 and 8, and Comparative Example 1 (effective area of fuel electrode: 150 cm$^2$). The operating conditions of the test were as follows:

Fuel: ($H_2$+11% $H_2O$):$N_2$=1:2
Oxidant: Air
Power generating temperature: 700 to 1000° C.
Current density: 0.3 Acm$^{-2}$ FIG. 3 shows the generated potential at 700 to 1000° C. It was confirmed that although there is little difference in the generated potential compared with Comparative Example 1 at 900 to 1000° C., the potential difference increased at 900° C. or below, and the difference became about 0.2 V at 700° C. From the above results, it was confirmed that a solid oxide fuel cell having excellent output performance at a low temperature of 700° C. was provided by the composition of the electrolyte membrane such as Examples 1, 2, 4, 7 and 8. It was confirmed that the compositions of Examples 4 and 8 were particularly preferable.

Effect of Sintering Temperature

Example 30

A solid oxide fuel cell was fabricated in the same manner as in Example 1 except that the sintering temperature of the electrolyte membrane was 1340° C.

Example 31

A solid oxide fuel cell was fabricated in the same manner as in Example 1 except that the sintering temperature of the electrolyte membrane was 1350° C.

Example 32

A solid oxide fuel cell was fabricated in the same manner as in Example 1 except that the sintering temperature of the electrolyte membrane was 1450° C.

Example 33

A solid oxide fuel cell was fabricated in the same manner as in Example 1 except that the sintering temperature of the electrolyte membrane was 1500° C.

Example 34

A solid oxide fuel cell was fabricated in the same manner as in Example 1 except that the sintering temperature of the electrolyte membrane was 1510° C.

Power Generation Test

A power generation test was conducted using cells fabricated in Examples 1 and 30 to 34, and Comparative Example 1 (effective area of fuel electrode: 150 cm$^2$). The operating conditions of the test were as follows:
Fuel: (H$_2$+11% H$_2$O):N$_2$=1:2
Oxidant: Air
Power generating temperature: 800° C.
Current density: 0.3 Acm$^{-2}$ Gas Leakage Test Nitrogen gas was flowed into the air electrode support of each cell fabricated in Examples 1 and 30 to 34, and Comparative Example 1, pressure of 0.1 MPa was supplied from the air electrode, and the amount of the gas permeated the electrolyte membrane was measured. With this test, the gas permeability of the electrolyte membrane was evaluated.

TABLE 8

|  | Sintering temperature (° C.) | Generated potential (V) | Gas Permeation amount Q (×10$^{-10}$ ms$^{-1}$Pa$^{-1}$) |
|---|---|---|---|
| Example 1 | 1400 | 0.66 | 1.5 |
| Example 30 | 1340 | 0.58 | 10 |
| Example 31 | 1350 | 0.60 | 3.7 |
| Example 32 | 1450 | 0.64 | 0.7 |
| Example 33 | 1500 | 0.61 | 0.4 |
| Example 34 | 1510 | 0.58 | 0.5 |

Table 8 shows the results of the generated potential and the gas permeation amount of the electrolyte membrane with respect to the sintering temperature. It was confirmed that although the generated potentials in the cases of 1340° C. in Example 30 and 1510° C. in Example 34 were higher than the potential of Comparative Example 1, these potentials were lower than that of the other Examples. As for the gas permeation amount, the gas permeation amount Q was within the preferable range of 2.8×10$^{-9}$ ms$^{-1}$Pa$^{-1}$ or less. From the above results, the sintering temperature of the electrolyte membrane is preferably within the range of 1350 to 1500° C.

What is claimed is:

1. A solid oxide fuel cell comprising a single cell having an air electrode disposed on a surface of an electrolyte membrane and a fuel electrode disposed on the other surface of the electrolyte membrane, a first electrode reaction layer having open pores interposed between the electrolyte membrane and the air electrode so as to accelerate a reaction of forming oxygen ions from oxygen gas and electrons, a second electrode reaction layer interposed between the electrolyte membrane and the fuel electrode and including NiO and scandia-doped zirconia, and an interconnector having a role of electrical connection;
wherein the electrolyte membrane includes only a first layer comprising a material having an oxygen-ionic conductivity of S1 on the air-electrode side, and a second layer comprising a material containing at least zirconia and having an oxygen-ionic conductivity of S2 on the fuel-electrode side, with an outer surface of the first layer engaging the first electrode reaction layer, and with an outer surface of the second layer engaging the second electrode reaction layer; and
wherein the oxygen-ionic conductivity of S1 on the air-electrode side and the oxygen-ionic conductivity of S2 on the fuel-electrode side have a relationship of S1>S2.

2. The solid oxide fuel cell according to claim 1, wherein the thickness of the first layer is 5 to 90% with respect to the total thickness of the electrolyte membrane.

3. The solid oxide fuel cell according to claim 2, wherein the thickness of the first layer is 30 to 80% with respect to the total thickness of the electrolyte membrane.

4. The solid oxide fuel cell according to claim 1, wherein the second layer comprises a yttria-doped zirconia material.

5. The solid oxide fuel cell according to claim 1, wherein the first layer comprises a scandia-doped zirconia material.

6. The solid oxide fuel cell according to claim 5, wherein the amount of the scandia in the scandia-doped zirconia is 3 to 12 mol %.

7. The solid oxide fuel cell according to claim 5, wherein the amount of the scandia in the scandia-doped zirconia is 8 to 12 mol %.

8. The solid oxide fuel cell according to claim 5, wherein the scandia-doped zirconia is further doped with at least one oxide of 5 mol % or less which is selected from a group consisting of CeO$_2$, Sm$_2$O$_3$, Gd$_2$O$_3$, Yb$_2$O$_3$, Er$_2$O$_3$ and Bi$_2$O$_3$.

9. The solid oxide fuel cell according to claim 4, wherein the amount of yttria in the yttria-doped zirconia is 3 to 12 mol %.

10. The solid oxide fuel cell according to claim 1, wherein both of the first and second layers comprise a zirconia doped with at least scandia and yttria; and the amount Sc1 of the scandia in the first layer and the amount Sc2 of the scandia in the second layer have a relationship of Sc1>Sc2.

11. The solid oxide fuel cell according to claim 10, wherein the total amount of scandia and yttria in the layers composed of zirconia doped with scandia and yttria is 3 to 12 mol %.

12. The solid oxide fuel cell according to claim 10, wherein the layers composed of zirconia doped with scandia and yttria are further doped with at least one oxide of 5 mol % or less which is selected from a group consisting of $CeO_2$, $Sm_2O_3$, $Gd_2O_3$, $Yb_2O_3$, $Er_2O_3$ and $Bi_2O_3$.

13. The solid oxide fuel cell according to claim 1, wherein the first layer comprises lanthanum gallate represented by a general formula $La_{1-a}A_aGa_{1-b}B_bO_3$ or $La_{1-a}A_aGa_{1-b-c}B_bC_cO_3$ (where A is any one or more of Sr, Ca and Ba; B comprises any one or more of Mg, Al, In; and C is any one or more of Co, Fe, Ni and Cr).

14. The solid oxide fuel cell according to claim 1, wherein the first layer comprises cerium-containing oxide represented by a general formula $(CeO_2)_{1-2x}(B_2O_3)_x$ (where B is any one of Sm, Gd and Y, and $0.05 \leq X \leq 0.15$).

15. A solid oxide fuel cell comprising a single cell having an air electrode disposed on a surface of an electrolyte membrane and a fuel electrode disposed on the other surface of the electrolyte membrane, a first electrode reaction layer having open pores interposed between the electrolyte membrane and the air electrode so as to accelerate the reaction of forming oxygen ion from oxygen gas and electron, a second electrode reaction layer interposed between the electrolyte membrane and the fuel electrode and including NiO and scandia-doped zirconia, and an interconnector having a role of electrical connection;

wherein the electrolyte membrane includes only a first layer comprising a zirconia material doped with at least scandia and having an oxygen-ionic conductivity of S1 on the air electrode side, and a second layer comprising a material containing at least a cerium-containing oxide and having an oxygen-ionic conductivity of S2 on the fuel-electrode side, with an outer surface of the first layer engaging the first electrode reaction layer, and with an outer surface of the second layer engaging the second electrode reaction layer; and the oxygen-ionic conductivity of S1 on the air-electrode side and the oxygen-ionic conductivity of S2 on the fuel-electrode side have a relationship of S1>S2.

16. The solid oxide fuel cell according to claim 15, wherein the thickness of the first layer is 10 to 90% with respect to the total thickness of the electrolyte membrane.

17. The solid oxide fuel cell according to claim 15, wherein the thickness of the first layer is 30 to 80% with respect to the total thickness of the electrolyte membrane.

18. The solid oxide fuel cell according to claim 15, wherein the second layer comprises cerium-containing oxide represented by a general formula $(CeO_2)_{1-2x}(B_2O_3)_x$ (where B is any one of Sm, Gd and Y, and $0.05 \leq X \leq 0.15$).

19. The solid oxide fuel cell according to claim 1, wherein the first electrode reaction layer is a layer in which lanthanum manganite represented by $(La_{1-x}Ax)_yMnO_3$ (where A is either Ca or Sr) and scandia-doped zirconia are evenly mixed.

20. The solid oxide fuel cell according to claim 1, wherein the air electrode comprises lanthanum manganite represented by $(La_{1-x}Ax)_yMnO_3$ (where A is either Ca or Sr).

21. The solid oxide fuel cell according to claim 1, wherein the electrolyte membrane is formed on a surface of the first electrode reaction layer, and thereafter sintered at 1350 to 1500° C.

22. The solid oxide fuel cell according to claim 1, wherein a ratio of NiO to scandia-doped zirconia in the second electrode reaction layer is in a range of 10/90 to 50/50 by weight, and the amount of scandia in the NiO and scandia-doped zirconia in the second electrode reaction layer is 3-12 mol %.

* * * * *

UNITED STATES PATENT AND TRADEMARK OFFICE
CERTIFICATE OF CORRECTION

PATENT NO.       : 7,569,292 B2
APPLICATION NO.  : 11/071112
DATED            : August 4, 2009
INVENTOR(S)      : Hiwatashi It is certified that error appears in the above-identified patent and that said Letters Patent is hereby corrected as shown below:

Title page:
   In section (57), the "ABSTRACT", 14th line, change "the fuel electrode side" to --the fuel-electrode side--.

Column 1:
   Line 10, change "high output performance" to --high-output performance--.
   Line 11 and line 23, change "900.degree.C." to --900°C--.

Column 2:
   Line 30, change "S1<S2" to --S1>S2--.

Column 3:
   Line 9, change "900.degree.C." to --900°C--.
   Line 46, change "rhombohederal" to --rhombohedral--.

Column 4:
   Line 12, change "rhombohederal" to --rhombohedral--.
   Line 26, change "hederal" to --hedral--.
   Line 33, change "Sc1<Sc2" to --Sc1>Sc2--.
   Line 58, change "rhombohederal" to --rhombohedral--.

Column 5:
   Line 20, change "rhombohederal" to --rhombohedral--.
   Line 63, change "surface the electrolyte" to --surface of the electrolyte--.

Column 6:
   Line 65, change "0.15)which" to --0.15) which--.

Column 7:
   Lines 34-35, change "700.degree.C." to --700°C.--.
   Line 38, change "700.degree.C.," to --700°C,--.
   Line 45, change "700.degree.C." to --700°C.--.
   Line 65, change "1500.degree.C." to --1500°C.--.

Column 8:
   Line 6, change "1350.degree.C." to --1350°C--.
   Line 8, change "1500degree.C." to --1500°C--.
   Line 35, change "the Electrolyte" to --the electrolyte--.
   Line 55, change "ion pass through" to --ion passes through--.

Column 9:
  Line 10, change "fuel-electrode-side-reaction" to --fuel-electrode-side reaction--.

Column 10:
  Line 1, change "lanthanum gal late" to --lanthanum gallate--.
  Table 1, 4th line under the heading "Composition", change "ZrO$_2$ 10 mol" to --ZrO$_2$-10 mol--.

Column 12:
  Table 2, 1st line under the heading "First layer", change "90 molZrO$_2$" to --90 mol % ZrO$_2$--.

Column 15:
  Line 30, change "tion (2) and (3)" to --tions (2) and (3)--.

Column 16:
  Line 38, change "to NiO/CSZ)" to --to as NiO/CSZ)--.

Column 17:
  Line 6 and line 8, change "inter-connector" to --interconnector--.

Column 20:
  Line 56, change "the gas permeated" to --the gas that permeated--.

Column 22:
  Line 58, change "(CeO" to --(CeO$_2$)$_{0.8}$(Sm$_2$O$_3$)$_{0.1}$--.
  Line 59, delete "2)$_{0.8}$(Sm$_2$O$_3$)$_{0.1}$".
  Line 61, change "eter was both 0.5 μm" to --eter for both was 0.5 μm--.

Column 23:
  Line 12, change "the gas permeated" to --the gas that permeated--.

Column 24:
  Line 49, change "the gas permeated" to --the gas that permeated--.

Column 25:
  Delete lines 25-27 and replace them with --(Thickness Ratio of First Layer in Electrolyte membrane (the case where the air-electrode side is a material containing zirconia such as SSZ))--.

Column 26:
  Line 23, change "the gas permeated" to --the gas that permeated--.

Column 27:
  Delete lines 1-3 and replace them with --(Thickness Ratio of First Layer in ELECTROLYTE MEMBRANE (the case where the cerium-containing oxide is used on the Air-Electrode Side))--.
  Line 65, change "the gas permeated" to --the gas that permeated--.

CERTIFICATE OF CORRECTION (continued)
U.S. Pat. No. 7,569,292 B2

Column 29:
    Line 53, change "the gas permeated" to --the gas that permeated--.

Column 30:
    Line 43, change "a yttria-doped" to --an yttria-doped--.

Column 31:
    Lines 8-9, change "$La_{1-a}A_aGa_{1-b}B_bO_3$ or $La_{1-a}A_aGa_{1-b-c}B_bC_cO_3$" to --$La_{1-a}A_aGa_{1-b}B_bO_3$ or $La_{1-a}A_aGa_{1-b-c}B_bC_cO_3$-- (the various non-subscripted dashes and hyphens in the printed patent document are supposed to be subscripted minus signs).
    Line 14, change "$(CeO_2)_{1-2x}(B_2O_3)_x$" to --$(CeO_2)_{1-2x}(B_2O_3)_x$-- (the non-subscripted dash in the printed patent document is supposed to be a subscripted minus sign).
    Line 31, change "air electrode side" to --air-electrode side--.

Column 32:
    Line 15, change "$(CeO_2)_{1-2x}(B_2O_3)_x$" to --$(CeO_2)_{1-2x}(B_2O_3)_x$-- (the non-subscripted dash in the printed patent document is supposed to be a subscripted minus sign).
    Line 19 and line 23, change "$(La_{1-x}Ax)_yMnO_3$" to --$(La_{1-x}A_x)_yMnO_3$-- (the non-subscripted hyphen in the printed patent document is supposed to be a subscripted minus sign; "Ax" is supposed to be --$A_x$--).

Signed and Sealed this

Sixteenth Day of March, 2010

David J. Kappos
*Director of the United States Patent and Trademark Office*